United States Patent
Sumitani et al.

(10) Patent No.: US 12,473,542 B2
(45) Date of Patent: Nov. 18, 2025

(54) β-AMYLASE AND METHOD FOR UTILIZATION AND PRODUCTION THEREOF

(71) Applicant: UNIVERSITY PUBLIC CORPORATION OSAKA, Osaka (JP)

(72) Inventors: Jun-ichi Sumitani, Sakai (JP); Shuji Tani, Sakai (JP); Takashi Kawaguchi, Sakai (JP)

(73) Assignee: UNIVERSITY PUBLIC CORPORATION OSAKA, Osaka (JP)

( * ) Notice: Subject to any disclaimer, the term of this patent is extended or adjusted under 35 U.S.C. 154(b) by 921 days.

(21) Appl. No.: 17/603,836

(22) PCT Filed: Apr. 14, 2020

(86) PCT No.: PCT/JP2020/016434
§ 371 (c)(1),
(2) Date: Oct. 14, 2021

(87) PCT Pub. No.: WO2020/213604
PCT Pub. Date: Oct. 22, 2020

(65) Prior Publication Data
US 2023/0077057 A1    Mar. 9, 2023

(30) Foreign Application Priority Data
Apr. 15, 2019  (JP) ................ 2019-077041
Aug. 7, 2019  (JP) ................ 2019-145697

(51) Int. Cl.
| | |
|---|---|
| *C12N 9/24* | (2006.01) |
| *A23L 5/00* | (2016.01) |
| *A23L 33/135* | (2016.01) |
| *C12N 5/10* | (2006.01) |
| *C12N 9/26* | (2006.01) |
| *C12N 15/63* | (2006.01) |
| *C12N 15/70* | (2006.01) |
| *C12P 19/12* | (2006.01) |
| *C12P 19/22* | (2006.01) |

(52) U.S. Cl.
CPC ......... *C12N 9/2425* (2013.01); *A23L 33/135* (2016.08); *C12N 5/10* (2013.01); *C12N 15/63* (2013.01); *C12P 19/12* (2013.01); *C12P 19/22* (2013.01); *C12N 2523/00* (2013.01)

(58) Field of Classification Search
CPC ........ C12N 9/2425; C12N 5/10; C12N 15/63; C12N 2523/00; C12N 1/205; C12N 15/70; A23L 33/135; A23L 5/00; C12P 19/12; C12P 19/22; C12R 2001/07; Y02E 50/10

See application file for complete search history.

(56) References Cited

U.S. PATENT DOCUMENTS 4,970,158 A    11/1990  Outtrup et al.

FOREIGN PATENT DOCUMENTS

| | | |
|---|---|---|
| CN | 101153276 A | 4/2008 |
| CN | 107164345 A | 9/2017 |
| GB | 1408158 A | 10/1975 |
| JP | S48-067487 A | 9/1973 |
| JP | S61-282073 A | 12/1986 |
| JP | S62-079746 A | 4/1987 |
| JP | S62-201577 A | 9/1987 |
| JP | 2011-036237 A | 2/2011 |

OTHER PUBLICATIONS

Experimental methods of starch and related sugars (1989) (Partial translation attached).
Bulletin of Applied Glycoscience vol. 1 No. 2 194 to 200 (2011) (Partial translation attached).
Japan Patent Office, International Search Report issued in corresponding Application No. PCT/JP2020/016434 mailed Jun. 30, 2020.

*Primary Examiner* — Satyendra K Singh
(74) *Attorney, Agent, or Firm* — Stites & Harbison, PLLC; Mandy Wilson Decker

(57) ABSTRACT

An object is to obtain a β-amylase having heat resistance even to high temperatures exceeding 60° C. By screening β-amylase producing bacteria from a soil sample, a novel *Bacillus halosaccharovorans* strain having a novel β-amylase with heat resistance and the β-amylase from the novel *B. halosaccharovorans* strain were obtained.

20 Claims, 8 Drawing Sheets
Specification includes a Sequence Listing.

Figure 5

β-AMYLASE AND METHOD FOR UTILIZATION AND PRODUCTION THEREOF

TECHNICAL FIELD

The present invention relates to a novel β-amylase and use and production method thereof.

BACKGROUND ART

Starch is an important nutrient source for organisms and, like cellulose, is one of the polysaccharides abundantly present on the earth. Starch is composed of amylose, in which glucose units are linearly polymerized by α-1,4-linkages, and amylopectin, in which amylose chains are branched with α-1,6-linkages.

When native starch is suspended in water and heated, amylose and amylopectin molecules are dispersed to form a starch solution or starch glue. Starch having natural crystalline and granule structure is referred to as raw starch in order to distinguish it from heat-gelatinized starch. The crystalline structure of raw starch can be destroyed by heating and hydration.

Amylase is a generic term for enzymes that hydrolyze the α-1,4 and α-1,6 linkages of amylose and amylopectin in the starch.

Amylases can be classified, according to the mode of action, into two major types of endoamylase and exoamylase. Alpha amylase is known as endoamylase, and is an enzyme randomly hydrolyzing glucose chains of starch. Beta amylase is known as exoamylase, and is an enzyme acting to digest polysaccharides, such as starches and glycogens, in which glucoses are polymerized by α-1,4 linkages, into maltose units from the non-reducing ends.

Beta amylase is used for production of maltose and food processing because of its characteristics capable of producing maltose from starch. Beta amylase has been found in sweet potato, wheat, barley, soybean, and the like, and has become known as an enzyme widely distributed in higher plants. On the other hand, it was believed for a long time that there was no microbial β-amylase, but microbial β-amylases have been found one after another since the 1970's (Non-Patent Document 1).

PRIOR ART DOCUMENTS

Patent Document

Patent Document 1: Japanese Patent Laid-open Publication No. 2011-036237

Non-Patent Documents

Non-Patent Document 1: [*Experimental methods of starch and related sugars*] (1989)
Non-Patent Document 2: Bulletin of Applied Glycoscience Vol. 1 No. 2 194 to 200 (2011)

SUMMARY OF THE INVENTION

Problems to be Solved by the Invention

Plant β-amylase can be produced relatively inexpensively and therefore plant raw materials have been mainly used in industrial production of β-amylase so far. However, with the recent global population growth and the increasing demand for biofuels such as bioethanol, as renewable resources, grain demand and price tend to increase worldwide. In this view, it is unclear whether grains can be inexpensively and stably supplied as raw materials of plant β-amylase in the future.

Microbial β-amylases have been discovered one after another, but only a few have been put to practical use. This is because the microbial β-amylases reported to date are low in heat resistance and yield and because many of the producing bacteria are classified as pathogenic bacteria, which are not suitable for food use. As one of very few examples, Amano Enzyme Inc. sells a β-amylase from *Bacillus flexus* as an industrial enzyme (Patent Document 1 and Non-Patent Document 2).

The β-amylase from *Bacillus flexus* has relatively high heat resistance as compared to β-amylases from other microorganisms, but lower than soybean enzyme, which has the highest heat resistance among plant β-amylases. Therefore, it cannot be said that the β-amylase from *Bacillus flexus* has sufficient heat resistance. In addition, the soybean enzyme with excellent heat resistance is known to has low cleaving activity on raw starch.

Industrially, starches are generally heated before digestion with amylase. From the viewpoint of energy saving in recent years, however, it is desirable that raw starch, as it is without heat gelatinization, can be enzymatically treated with high efficiency.

As mentioned above, there is a need to develop a β-amylase from a non-pathogenic microorganism.

Solutions to the Problems

The present inventors have surprisingly found that non-pathogenic *Bacillus halosaccharovorans* strain No. 58, which has newly been isolated by the inventors, produces a β-amylase having a higher heat resistance than conventional β-amylases from grains and microorganisms.

Thus, the present invention provides a bacteria strain identified by the accession number NITE BP-02937.

The present invention also provides a β-amylase produced by a bacteria strain identified by the accession number NITE BP-02937.

Further, the present invention provides a β-amylase having:
(i) the amino acid sequence set forth in SEQ ID No. 2 or 12;
(ii) the amino acid sequence set forth in SEQ ID No. 2 or 12 except for one or several amino acid deletions, substitutions, insertions and/or additions; or
(iii) an amino acid sequence having 90% or more sequence identity to the amino acid sequence set forth in SEQ ID No. 2 or 12.

Further, the present invention provides a β-amylase that contains one or more substitutions selected from a threonine to proline substitution at a position corresponding to amino acid position 4, a threonine to lysine/arginine substitution at a position corresponding to amino acid position 15, and a glutamine to aspartic acid substitution at a position corresponding to amino acid position 306, with reference to the amino acid sequence set forth in SEQ ID No. 2.

Furthermore, the present invention provides a β-amylase having:
(i) the amino acid sequence set forth in any one of SEQ ID Nos. 18 to 25;
(ii) the amino acid sequence set forth in any one of SEQ ID Nos. 18 to 25 except for one or several amino acid deletions, substitutions, insertions and/or additions; or (iii) an amino acid sequence having 90% or more sequence identity to the amino acid sequence set forth in any one of SEQ ID Nos. 18 to 25.

Moreover, the present invention provides a DNA encoding a β-amylase as described above.

Further, the present invention provides a DNA that encodes a protein having β-amylase activity, and
(i) has the nucleic acid sequence set forth in SEQ ID No. 1 or 13;
(ii) has a nucleic acid sequence that is 90% or more identical to the nucleic acid sequence set forth in SEQ ID No. 1 or 13; or
(iii) hybridizes to a DNA having the nucleic acid sequence (i) or (ii) under stringent conditions.

Furthermore, the present invention provides a DNA that encodes a protein having β-amylase activity, and
(i) has the nucleic acid sequence set forth in any one of SEQ ID Nos. 26 to 33;
(ii) has a nucleic acid sequence having 90% or more identical to the nucleic acid sequence set forth in any one of SEQ ID Nos. 26 to 33; or
(iii) hybridizes to a DNA having the nucleic acid sequence (i) or (ii) under stringent conditions.

Moreover, the present invention provides a DNA having a degenerate sequence of the nucleic acid sequence set forth in any one of SEQ ID Nos. 1, 13 and 26 to 33.

Further, the present invention provides a vector carrying a DNA as described above.

Furthermore, the present invention provides a microorganism carrying a vector that carries a DNA as described above.

Moreover, the present invention provides a method of producing a β-amylase, the method including a step of extracting the β-amylase from the bacteria strain or a culture of the microorganism.

Further, the present invention provides a method of producing maltose, the method including a step of treating a starch with a β-amylase as described above.

Furthermore, the present invention provides a method of producing maltose, the method including a step of treating a starch with a bacteria strain as described above or a microorganism as described above.

Moreover, the present invention provides a method of producing maltose, the method including a step of treating a raw starch with a β-amylase as described above.

Further, the present invention provides a method of modifying a food product, the method including a step of treating the food product with a bacteria strain as described above, a β-amylase as described above, or a microorganism as described above.

Furthermore, the present invention provides an enzyme preparation using a bacteria strain as described above, a β-amylase as described above, or a microorganism as describe above.

Effects of the Invention

According to the present invention, a novel β-amylase having no pathogenicity is provided.

BRIEF DESCRIPTION OF THE DRAWINGS

FIG. 5 shows the nucleic acid sequence of the β-amylase gene of the present invention and the deduced amino acid sequence.

EMBODIMENTS OF THE INVENTION

Properties of the β-Amylase

Figure 1:
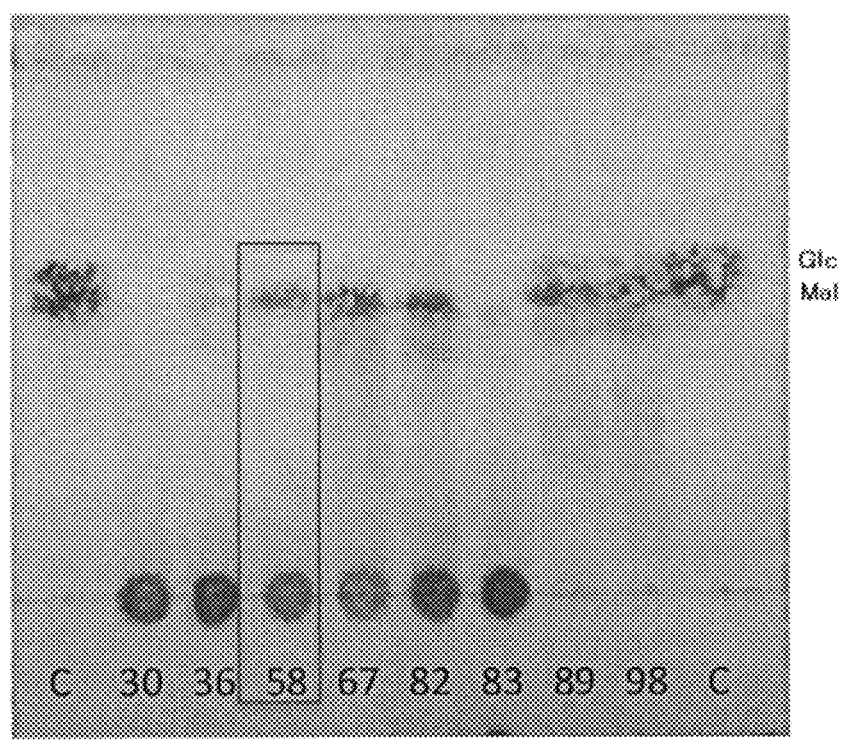
FIG. 1 shows results of TLC analysis of starch cleavage products by culture supernatants of candidate strains.

The enzyme according to the present invention is a β-amylase, which brakes α-1,4 glucosidic bonds in glucose polysaccharides in starch into maltose units from the non-reducing ends.

The β-amylase produced by the strain No. 58 has the following properties.

(1) A substrate for the β-amylase of the present invention is not limited to starch. The β-amylase of the present invention can react with, for example, amylose, amylopectin, glycogen, or dextrin.

(2) This enzyme has a molecular weight of about 60,000 Da.

(3) This enzyme has an optimum temperature of about 50° C. Under conditions of about 37° C. to 60° C. and pH 7.0, this enzyme exhibits 70% or more of the activity at 50° C. when reacted with its substrate for 10 minutes. In addition, this enzyme has not lost its activity even after being treated at 60° C. for 75 minutes. Even after being treated at 65° C. for 30 minutes, this enzyme has 40% of the activity at 50° C.

(4) This enzyme has an optimum pH of about 7.0. Under the conditions of pH 6.0 to 9.0, this enzyme shows 80% or more residual activity as compared with the activity at pH 7.0 when reacting with its substrate at 37° C. for 10 minutes. In addition, even after being left at pH 5.0 to 9.0 and 4° C. for 16 hours, and then the pH is returned to 7.0, this enzyme shows 80% or more residual activity as compared with activity of the sample one left at pH 7.0 and 4° C. for 16 hours, when reacting with its substrate at 37° C. for 10 minutes.

(5) This enzyme has activity on raw starch, and can digest raw starch from wheat by 65% by reacting for 24 hours under conditions of 60° C. and pH 7.0. It can also digest raw starch from corn by 27% by reacting for 8 hours at 70° C. and pH 7.0.

(6) This enzyme digests starch to yield only maltose.

The β-amylase of the present invention may be a β-amylase having the amino acid sequence set forth in SEQ ID No. 2 or 12, the amino acid sequence set forth in SEQ ID No. 2 or 12 except for one or several amino acid deletions, substitutions, insertions and/or additions, or an amino acid sequence having 90% or more sequence identity to SEQ ID NO. 2 or 12. The amino acid sequence identity is preferably 95%, and more preferably 99%, or more. In addition, the β-amylase of the present invention may be in the form of a fusion protein attached to another protein or may be in the form immobilized on resin such as beads, as long as it retains β-amylase activity. As the fusion protein, a form can be considered, which is, for example, a protein conjugated to a debranching enzyme, isoamylase, pullulanase, glucosidase, glucoamylase, α-amylase, protease, lipase, phosphatase, xylanase or the like, or a protein fused with a histidine (His) tag, a maltose binding protein (MBP) tag, or glutathione S-transferase (GST) for purification. The substitutions are preferably conservative substitutions. The conservative substitution refers to a substitution that does not change the properties, such as acidity or basicity, from the substituted amino acid, and specifically, to a substitution among Phe, Trp, and Tyr, a substitution among Leu, Ile, and Val, a substitution among Lys, Arg, and His, a substitution between Asp and Glu, and a substitution between Ser and Thr. In particular, regarding a deletion at the N- and/or C-termini of the amino acid sequence, the number of truncated amino acids is not limited as long as the resultant truncation variant has an enzyme activity equivalent to that of a β-amylase having the amino acid sequence set forth SEQ ID NO: 2. The truncation variant can be easily obtained without requiring trial and error. The "one or several" as used herein may be, for example, a number between 1 to 9, preferably 1 to 8, more preferably 1 to 6, more preferably 1 to 5, more preferably 1 to 4, more preferably 1 to 3, or more preferably 1 to 2.

In addition, a β-amylase having further excellent heat resistance can be obtained in the case where the substitution site is one or more substitutions selected from a threonine to proline substitution at amino acid position 4, a threonine to lysine substitution at amino acid position 15 (SEQ ID NO: 19), a threonine to arginine substitution at amino acid position 15 (SEQ ID NO: 20), and a glutamine to aspartic acid substitution at amino acid position 306 (SEQ ID NO: 21), of the amino acid sequence set forth in SEQ ID NO: 2 (SEQ ID NO: 18), or alternatively one or more substitutions selected from a threonine to proline substitution at amino acid position 33 (SEQ ID NO: 22), a threonine to lysine substitution at amino acid position 44 (SEQ ID NO: 23), a threonine to arginine substitution at amino acid position 44 (SEQ ID NO: 24), and a glutamine to aspartic acid substitution at amino acid position 335 (SEQ ID NO: 25), of the amino acid sequence set forth in SEQ ID NO: 12.

In addition, the β-amylase of the present invention may be a β-amylase having: the amino acid sequence set forth in any one of SEQ ID Nos. 18 to 25; the amino acid sequence set forth in any one of SEQ ID Nos. 18 to 25, except for one or several amino acid deletions, substitutions, insertions and/or additions; or an amino acid sequence having 90% or more sequence identity to the amino acid sequence set forth in any one of SEQ ID Nos. 18 to 25. These sequences preferably have a substitution as described above. The amino acid sequence identity is preferably 95%, and more preferably 99%, or more.

The identity, in the context of the present invention, is calculated as a ratio (percentage) of matched bases or amino acids at corresponding positions between the two sequences to be compared when they are aligned so as to maximize the matching. Between two sequences, the identity can be represented by the following function:

Identity (%)=(Number of matched bases or amino acids at corresponding positions between two sequences)/(Total number of bases or amino acids in the reference sequence×100).

Analysis of amino acid sequence or comparison of identity of two or more amino acid sequences can be performed using an analysis program commonly used by those skilled in the art. For example, GENETYX-WIN Ver. 7 can be used to analyze an amino acid sequence, and BLAST search at NCBI (www.ncbi.nlm.nih.gov/) can be used for the identity of the amino acid sequence. Similarly to the amino acid sequence, nucleic acid sequence can be analyzed and searched with an analysis program commonly used by those skilled in the art.

Measurement of enzyme activity of the amylase of the present invention is not particularly limited as long as it is a method in which the enzyme digests its substrate and the saccharides generated by digestion are quantitatively measured. For example, enzyme activity can be measured by using a reducing sugar quantification method such as Somogyi-Nelson method.

In addition to the quantitative detection methods as described above, for the purpose of only detecting a sugar contained in the products of the enzymatic reaction of the amylase according to the present invention, it may be detected using a qualitative detection method. This is not particularly limited as long as a saccharide or the like contained in an analyte can be identified. For example, a detection method using thin layer chromatography (TLC) can be considered.

The β-amylase of the present invention, even after heat treatment at 60° C. for 10 minutes, may have at least 80% of β-amylase activity as compared to an unheated one. Further, the present enzyme, even after heat treatment at 60° C. for 20, 40, or 80 minutes, may have at least 80% of β-amylase activity as compared to an unheated one.

The β-amylase of the present invention may have raw starch degrading activity. In the present invention, the raw starch is a starch that has not been subjected to heat treatment. Unlike heat-gelatinized starch, raw starch has a crystal granular structure. The crystal structure of raw starch is destroyed by heating and hydration. The heating temperature varies depending on the type of raw starch. For example, a starch from wheat or corn has a high gelatinization temperature and therefore it is required to heat it at 80° C. or more for gelatinization.

As a substrate of the enzyme, starch from any organism can be used, which is, for example, soybean, red bean, barley, wheat, corn, rice, potato, sweet potato, arrowroot, bracken, green bean, broad bean, lotus root, cassava, sago palm, dogtooth violet, or the like.

A specific example of the bacteria obtained in the present invention is *Bacillus halosaccharovorans* strain No. 58 (also referred herein to simply as "the strain No. 58"), which was deposited at the National Institute of Technology and Evaluation, Patent Microorganisms Depositary (Room 122, 2-5-8, Kazusakamatari, Kisarazu-shi, Chiba) under the accession number NITE BP-02937 on Apr. 12, 2019. The strain No. 58 is a rod-shaped, aerobic bacterium characterized in that it can form cream-colored colonies and spores.

The β-amylase according to the present invention, having amino acids set forth in SEQ ID NO: 2 is an enzyme obtained from the strain No. 58. The strain No. 58 carries a DNA sequence set forth in SEQ ID NO: 1 and has a β-amylase which is a protein having the amino acid sequence of SEQ ID NO: 2.

The β-amylase of the present invention can be obtained, for example, by culturing a bacterium, such as the strain No. 58, having DNA set forth in SEQ ID NO: 1 or a recombinant that carries a vector containing the said sequence or has incorporated the sequence. The culture of the strain No. 58 or the recombinant can be carried out in a manner used commonly by those skilled in the art for the production of amylase. A host can also be a microorganism commonly used by those skilled in the art. The host microorganism used is not particularly limited and can be, for example, a non-pathogenic E. coli, yeast, actinobacterium, alga, lactic acid bacterium, hay bacillus, or the like.

Culture conditions can be appropriately adjusted to be optimal according to the host and expression system. A medium is not particularly limited as long as it allows the subject to be cultured to grow. The medium may be solid or preferably liquid.

In a more specific example, the β-amylase gene is inserted into an E. coli expression vector, which is used to transform E. coli. The resulting transformant is inoculated into 2 ml of 2×TY medium containing an antibiotic, if required, and cultured with shaking at 30° C. for 24 hours to obtain bacterial cells. The collected bacterial cells are ultrasonically disrupted, whereby β-amylase can be obtained in the disrupted fluid.

Examples of the solid medium include residues of fruit such as banana, apple, and orange, beans such as soybean, and plant resource-derived biomass such as vegetable oil lees.

In the present invention, the culture is a mixture containing a culture substrate, on which microorganisms have been cultured, and a reaction product thereof, as well as the cultured cells. Cultures include, but are not limited to, cultured microorganisms (the inoculated microorganisms and microorganisms proliferated from the former), media, medium supplements/additives, and substances secreted from the cultured microorganisms. The culture may be wholly or partially liquid or solid. A liquid culture is also referred to as a culture fluid. The culture preferably contains the cultured microorganisms and at least one of secretions therefrom. The culture is preferably a culture fluid.

A DNA of the present invention is a DNA encoding a j-amylase as described above.

Also, the DNA of the present invention may be a DNA encoding a protein having β-amylase activity, the DNA
(i) having the nucleic acid sequence set forth in SEQ ID No. 1 or 13;
(ii) having a nucleic acid sequence that is 90% or more identical to the nucleic acid sequence set forth in SEQ ID No. 1 or 13; or
hybridizing to a DNA having the nucleic acid sequence (i) or (ii) under stringent conditions.

The term "identical" in the context of the nucleic acid sequence is as described above. The stringent conditions are commonly known by those skilled in the art, and examples thereof include conditions of hybridization at 68° C. in a commercially available hybridization solution, ExpressHyb Hybridization Solution (Takara Bio Inc.), or conditions of hybridization at about 65° C. in the presence of 0.7 M to 1.0 M NaCl and washing at about 65° C. with a 0.1 to 2×SSC solution (1×SSC solution: 150 mM NaCl, 15 mM sodium citrate, pH 7.0), using DNA immobilized on a filter. The nucleic acid sequence has a nucleic acid sequence that is preferably 95% or more, more preferably 99% or more identical to the nucleic acid sequence set forth in SEQ ID NO: 1 or 13.

Where one or more substitution sites in the DNA sequence are selected from, for example, a substitution of adenine to cytosine at position 97 of SEQ ID NO: 1 (SEQ ID NO: 26), a substitution of cytosine to adenine at position 131 of SEQ ID NO: 1 (SEQ ID NO: 27), substitution of adenine to cytosine at position 130, cytosine to guanine at position 131 and adenine to cytosine at position 132 of SEQ ID NO: 1 (SEQ ID NO: 28), substitutions of cytosine to guanine at position 1003 and adenine to cytosine at position 1005 of SEQ ID NO: 1 (SEQ ID NO: 29), a substitution of adenine to cytosine at position 10 of SEQ ID NO: 13 (SEQ ID NO: 30), a substitution of cytosine to adenine at position 44 of SEQ ID NO: 13 (SEQ ID NO: 31), substitutions of adenine to cytosine at position 43, cytosine to guanine at position 44 and adenine to cytosine at position 45 of SEQ ID NO: 13 (SEQ ID NO: 32), and substitutions of cytosine to guanine at position 916 and adenine to cytosine at position 918 of SEQ ID NO: 13 (SEQ ID NO: 33), a β-amylase having more excellent heat resistance can be obtained.

Also, the DNA of the present invention may be a DNA encoding a protein having β-amylase activity, the DNA
(i) having the nucleic acid sequence set forth in any one of SEQ ID Nos. 26 to 33;
(ii) having a nucleic acid sequence having 90% or more, preferably 95% or more, and more preferably 99% or more identical to the nucleic acid sequence set forth in any one of SEQ ID Nos. 26 to 33; or
(iii) hybridizing to a DNA having the nucleic acid sequence (i) or (ii) under stringent conditions.

In addition, the DNA of present invention may be a DNA having a degenerate sequence of the nucleic acid sequence set forth in any one of SEQ ID Nos. 1, 13 and 26 to 33. Degenerate means that multiple codons encode a single amino acid. Therefore, if one of the amino acids encoded by degenerate sequences is arginine for example, the nucleic acid sequence may correspond to any of the six codons (CGU, CGC, CGA, CGG, AGA, AGG) encoding arginine.

The DNA of the present invention can be handled with genetic engineering techniques commonly performed by those skilled in the art. The DNA sequence set forth in SEQ ID NO: 1 may be obtained by PCR using the corresponding primers, or totally synthesized based on sequence information.

The DNA of the present invention is also provided in the form of a vector carrying the same. The vector is not limited as long as it is commonly used by those skilled in the art and suitable for incorporating the present gene. The vector used is a pBluescript II SK(+) vector or a pBluescript II SK(-) vector, for example.

The present invention provides a microorganism carrying a vector containing the DNA of the present invention. The host microorganism is not particularly limited as long as the microorganism is commonly used as a carrier of a vector by those skilled in the art. For example, the microorganism used can be a non-pathogenic E. coli, yeast, actinobacterium, alga, lactic acid bacterium, Bacillus subtilis, or the like.

The present invention also provides a method of producing a β-amylase.

The β-amylase of the present invention may be obtained by isolating the β-amylase from a culture fluid of a microorganism containing the β-amylase. Isolation can be carried out by a method commonly used by those skilled in the art. The production method includes steps of culturing bacterial cells and extracting the β-amylase from the culture or the cultured cells.

In the bacterial cell culture step, the strain No. 58 or a recombinant microorganism carrying the DNA of the present invention is cultured. A recombinant host is not particularly limited as long as it can be cultured and express a protein. For example, the recombinant host used can be a non-pathogenic *E. coli*, yeast, actinobacterium, alga, lactic acid bacterium, hay *bacillus*, or the like Culture conditions can be appropriately adjusted to be optimal according to the host and expression system. A medium is not particularly limited as long as it allows the subject to be cultured to grow. The medium may be solid or preferably liquid.

Culturing method is not particularly limited as long as it allows the subject to be cultured to grow. For example, static culture, shaking culture, anaerobic culture, or the like can be used.

For culturing the strain No. 58 for example, the following conditions can be mentioned. The medium used is a liquid medium for amylase-producing bacteria, a 2×TY medium (as described in Tables 1 and 2 of Examples), an LB medium, a nutrient agar medium (Difco), or the like.

The pH of the medium is preferably 6.0 to 9.0, and more preferably pH 7.0.

The culture temperature is preferably 20 to 50° C., and more preferably 45° C.

Under aerobic conditions, the microorganism can be cultured in static culture, shaking culture, or rotary culture.

In the step of collecting the β-amylase from the culture or the cultured cells, the β-amylase can be obtained by purification from the culture or the cultured cells containing the β-amylase in a purification step. A method of purifying the enzyme is not particularly limited as long as the β-amylase can be obtained from the culture or the cultured bacterial cells. For example, the present enzyme can be purified by subjecting a culture supernatant to centrifugation or filter filtration so as to remove the cells, the solid matter, and the like, and then to a combination of filtration with an ultrafiltration filter or concentration, salting-out or column chromatography, adsorption with activated carbon, or the like. The column used is not particularly limited as long as it can separate the enzyme, without inactivation, from other proteins and contaminants, and can be, for examples, an anion exchange chromatography column, a cation exchange chromatography column, a hydrophobic interaction chromatography column, a gel filtration chromatography column, an affinity chromatography column, or the like. For example, a TOYOPEARL Butyl-650M column, which is a hydrophobic interaction chromatography column, and a TOYOPEARL DEAE-650M column, which is an anion exchange chromatography column are used.

Detection of the purified or crudely purified protein can be carried out using a method that is not particularly limited as long as it can separate or detect the protein in a sample. For example, a method using electrophoresis like SDS-PAGE is used.

A buffer solution for enzyme activity measurement or enzyme purification described below, or the like can be appropriately modified so as to be used according to the purpose of an experiment. The nature of the buffer solution preferably does not affect the activity and stability of the enzyme. As the buffer solution, for example, Tris-HCl can be used.

Where the cultured bacterial cells are used, the method of producing the β-amylase of the present invention further includes a step of extracting the β-amylase from the cultured cells.

The method of extracting the β-amylase from the cultured cells is not particularly limited, and may be any method known to those skilled in the art. The β-amylase can be obtained by, for example, destroying a part or the whole of a structure of cell surface (for example, cell membrane) by solubilization (ultrasonic disintegration) of bacterial cells. The bacterial cells used for extraction may be live bacteria or dead bacteria.

Since the β-amylase of the present invention produces only maltose from starch, production of maltose is facilitated according to the method of producing the β-amylase of the present invention.

The present invention also provides a method of producing maltose, including a step of treating a starch with the β-amylase of the present invention.

Since enzyme treatment of starch is generally performed on gelatinized starch, formed by heating raw starch, a gelatinization step is carried out before the enzyme treatment. The heating temperature varies depending on the type of raw starch. A starch from wheat or corn has a high gelatinization temperature. If a β-amylase having low heat resistance is used for the treatment, the enzyme is deactivated by heat of heated starch and therefore it is necessary to cool the heated, gelatinized starch down to a temperature suitable for the enzyme reaction. This causes cooling cost of heated starch and also requires a cooling time for starch saccharification. In addition, cooling the substrate before the reaction increases a risk of growth of various bacteria.

The β-amylase of the present invention can be suitably used for starch saccharification because it has high heat resistance and therefore makes it possible to reduce the cooling cost of starch and/or shorten the cooling time. Due to the high heat resistance, the β-amylase can be added to a starch after or even during heat treatment. The temperature and pH after addition of the β-amylase are not particularly limited as long as at that temperature and pH, the enzyme can digest starch, as described in the enzyme properties. The β-amylase of the present invention can be added when the temperature of the substrate starch is at a temperature of 70° C. or less or when it is 60° C. or more to 70° C. or less. As a substrate of the enzyme, starch from any organism can be used, which is, for example, soybean, red bean, barley, wheat, corn, rice, potato, sweet potato, arrowroot, bracken, green bean, broad bean, lotus root, cassava, sago palm, dogtooth violet, or the like. The enzyme reaction can be stopped by reheating, or chemical treatment for e.g., pH adjustment, to deactivate the enzyme.

The β-amylase of the present invention can be used to produce maltose from starch. Since the β-amylase of the present invention produces only maltose from starch, production of maltose is facilitated according to the present invention.

The present invention also provides a method of producing maltose, including a step of treating a starch with the microorganism of the present invention.

The strain No. 58, when cultured, releases out the β-amylase as an extracellular enzyme into the culture fluid. Therefore, if the strain No. 58 is cultured together with starch, the β-amylase released from the bacterial cells reacts with starch to produce maltose. Thus, the bacterial cell to be cultured is not limited to the strain No. 58, and may be a recombinant microorganism having the β-amylase of the strain No. 58 as long as it can release out the β-amylase of the present invention as an extracellular enzyme. The culture conditions are not particularly limited as long as they allow the microorganisms to be cultured to grow, and other substances necessary for growth than starch may be included.

The recombinant microorganism to be used is not limited to a microorganism capable of releasing the β-amylase as an extracellular enzyme as long as the microorganism incapable of releasing the β-amylase can take up a starch, which is then converted into maltose by the β-amylase therein, and release out maltose. However, it is preferable if the microorganism releases out the β-amylase.

The microorganism carrying the β-amylase of the present invention can be used to produce maltose from starch. Since the microorganism carrying the β-amylase of the present invention produces only maltose from starch, it makes possible to facilitate the production of maltose.

The present invention also provides a method of producing maltose, including a step of treating a raw starch with the β-amylase of the present invention.

Conventional β-amylase has low activity on raw starch, and is unsuitable to use a raw starch as a substrate. The β-amylase of the present invention has high enzyme activity on raw starch and therefore can be suitably used for enzyme treatment of raw starch. The state of the raw starch is not particularly limited as long as the enzyme can react with the raw starch, but it is preferable if the raw starch is suspended in an aqueous solution. The temperature and pH after addition of the β-amylase are not particularly limited as long as at that temperature and pH, the enzyme can digest starch, as described in the enzyme properties. As a substrate of the enzyme, starch from any organism can be used, which is, for example, soybean, red bean, barley, wheat, corn, rice, potato, sweet potato, arrowroot, bracken, green bean, broad bean, lotus root, cassava, sago palm, dogtooth violet, or the like. The enzyme reaction can be stopped by reheating, or chemical treatment for e.g., pH adjustment, to deactivate the enzyme.

The β-amylase of the present invention can be used to produce maltose from raw starch.

The present invention also provides a method of modifying a food product using the β-amylase or the microorganism of the present invention. Modification of a food product refers to modifying a property of the food product. In the present invention, it refers to preferably improve a property of a food product containing a polysaccharide, such as starch, having an α-1,4 glucosidic bond. Modification includes, for example, improved texture of bread dough, increased volume of breads, anti-aging of bread products (keeping softness), preventing red baked color of bread dough that have been frozen or refrigerated, and keeping softness of rice cakes, by adding the enzyme of the present invention to the dough of bread or the like before baking. The food product that can be used is not particularly limited and it is preferable if the food product contains a polysaccharide, such as starch, having an α-1,4 glucosidic bond. Examples of the food product include dough of bread, rice cake, donut, pie, pizza, buns, and the like. The raw materials used are not limited to a raw material from wheat, and can be from soybean, red bean, barley, corn, rice, potato, sweet potato, arrowroot, bracken, green bean, broad bean, lotus root, cassava, sago palm, dogtooth violet, or the like.

The β-amylase according to the present invention has heat resistance and activity on raw starch, and therefore it can be preferably used for modification of food products. Also, the strain No. 58 has only β-amylase as an extracellular enzyme, and thus does not cause excessive degradation of starch or Maillard reaction, which occur when α-amylase or glucoamylase is used in bread dough. Therefore, the strain No. 58 is very useful as a source of purified β-amylase used for modification of food products or in bread dough. In addition, where the product is only maltose, there is an advantage of obtaining final food products with mild taste. Due to the heat resistance of this enzyme, there is also an advantage of easily control the reaction of the substrate. Unlike many plant-derived β-amylases, the optimum pH of which is acidic and therefore which often require a pH adjusting agent in use for enzyme treatment, the present enzyme, whose optimum pH is around 7, may not require a pH adjusting agent. Since the activity of this enzyme on raw starch can also act on ungelatinized starches, the enzyme may be also used in various starch products and starch-containing substrates.

In addition, this enzyme has excellent heat resistance, but does not have enzyme activity at a high temperature of 80° C. or more, and the enzyme activity is lost at a high temperature of 80° C. or more. Due to this property, in the case where this enzyme is incorporated into kneaded bread dough or the like before baking, this enzyme can lose its enzyme activity in the baking process. This makes it possible to easily control the process so that the enzyme is reacted with its substrate only for the desired reaction time, such as some time from the beginning of the baking process, and is finally allowed to be deactivated.

The present invention is also provided in the form of an enzyme preparation containing the β-amylase of the present invention or the microorganism of the present invention. The enzyme in the enzyme preparation may be a purified enzyme or a crude enzyme, such as a culture supernatant. The enzyme preparation may be composed of β-amylase alone, or may have an appropriate additive added thereto to such an extent as to not significantly impair the properties of the enzyme. Examples of forms of the enzyme preparation include tablets, pills, powders, granules, capsules, solutions, and the like. The enzyme preparation may be included in an atomizer such as a spray, and may contain another enzyme than amylase.

Examples of enzymes contained together with the present enzyme include debranching enzymes, isoamylases, pullulanases, glucosidases, glucoamylases, α-amylases, proteases, lipases, phosphatases, xylanases, and the like, and one or more of these enzymes may be used in combination.

Examples of the additive include binders (gum arabic, gelatin, sorbitol, tragacanth, polyvinylpyrrolidone, and the like), fillers (lactose, sugar, calcium phosphate, sorbitol, glycine, and the like), disintegrants (crystalline cellulose and the like), non-aqueous excipients (almond oil, fractionated coconut oil, or oily esters such as glycerin, propylene glycol, polyethylene glycol, and ethyl alcohol, and the like), preservatives (methyl or propyl p-hydroxybenzoate, sorbic acid, tocopherol, and the like), pH adjusters (sodium bicarbonate, potassium carbonate, citrates, acetates, and the like), thickeners (methylcellulose and the like), antioxidants (vitamin C, vitamin E, and the like), perfumes (synthetic fragrances, natural fragrances, esters, and the like), emulsifiers (lecithin, sorbitan monooleate, sucrose fatty acid ester, and the like), raising agents (ammonium carbonate and the like), suspending agents (syrups, gelatins, water-added edible fats, and the like).

The enzyme preparation can be widely used in applications, such as production of maltose by digesting polysaccharides, such as starch, having an α-1,4 glucosidic bond into maltose units, and modification of food products. For example, the enzyme preparation can be added to dough of bread, rice cake, donut, pie, pizza, buns, and the like. In addition, the enzyme preparation can be added to a grain, such as wheat, soybean, red bean, barley, corn, rice, potato, sweet potato, arrowroot, bracken, green bean, broad bean, lotus root, cassava, sago palm, dogtooth violet or the like, itself having starch, or to a crushed material thereof. Pretreatment such as crushing, heating, or chemical treatment may be carried out before addition of the enzyme preparation. The treatment conditions after addition of the enzyme preparation can be appropriately determined by those skilled in the art.

Hereinafter, the present invention will be described in detail with reference to examples, but the present invention is not limited to the examples.

Experiment 1: Screening and Identification of Bacteria with Heat-Resistant β-Amylase Beta amylase producing, heat-resistant bacteria were isolated from soil samples. The soils as screening sources were obtained from fields in Osaka Prefecture. Starch-assimilating strains were isolated from the soils. The isolated strains were cultured in a medium for amylase-producing bacteria (Table 1).

TABLE 1

The composition of the medium
for amylase-producing bacteria

| Corn starch | 1.0% |
|---|---|
| Peptone | 0.2% |
| Yeast extract | 0.2% |
| Calcium chloride | 0.2% |

Basic pH was set to 7.0. The medium composition and pH were modified according to the experiments. For screening, to the above-mentioned composition, after the pH was adjusted to 7.0, 1.0% gellan gum was added and the resultant was solidified on a plate and used.

One platinum loop of each of the isolated starch-assimilating strains was inoculated into a test tube containing 6 ml of a liquid medium for amylase-producing bacteria, and cultured with shaking at 60° C. for 3 days. After completion of the culture, the culture fluid was centrifuged (3200 rpm, 10 min, 4° C.) to collect the culture supernatant, which was used as a crude enzyme sample. To 100 μl of the crude enzyme sample, 100 μl of a substrate solution (1.5% soluble starch (Merck Corporation), 100 mM Tris-HCl, pH 7.0, 5 mM $CaCl_2$) was added to react overnight at 37° C. After the reaction, 5 μl of the reaction solution was subjected to thin layer chromatography.

Thin Layer Chromatography (TLC)

As a silica gel plate used in thin layer chromatography, silica gel 60 F254 (Merck Corporation) was used.

As a developing solvent, a 1-butanol/ethanol/chloroform/25% (w/w) ammonia solution (4/5/2/8, v/v/v/v) was used.

Maltose was detected by spraying a detection liquid (1% vanillin-containing concentrated sulfuric acid) 3 times on the developed silica gel plate and heating it at 120° C. for several minutes to develop color.

The results of TLC are shown in FIG. 1. As a result of the screening, several maltose-producing strains were obtained. A close investigation confirmed that one of the strains produced only maltose from soluble starch (FIG. 1: No. 58 in the box. C stands for control). Thus, the strain No. 58 having high maltose producing ability was obtained.

Measurement of amylase activity (reducing sugar quantification method) In a test tube, 100 μl of an enzyme sample (the culture supernatant, or the purified or crudely purified enzyme described below) was taken and pre-incubated at 37° C. for 10 minutes. One hundred microliters of a substrate solution (1.5% soluble starch, 100 mM Tris-HCl, 5 mM $CaCl_2$, pH 7.0, 37° C.) was added thereto to react at 37° C. for 10 minutes. The enzyme reaction was stopped by adding 400 μl of a DNS solution (0.5% dinitrosalicylic acid, 0.4 N NaOH, 30% sodium potassium tartrate tetrahydrate). Next, the mixed solution was boiled at 100° C. for 5 minutes, and then cooled with cold water for 5 minutes, followed by adding 1.8 ml of distilled water thereto and stirring. The stirred solution was measured for absorption at 480 nm with a spectrophotometer. Blank reaction was carried out with distilled water instead of the enzyme sample, and the blank value was subtracted from a measured value for an enzyme sample. One unit (U) of enzyme activity was defined as the amount of enzyme required to produce 1 μmol of maltose per minute. The enzyme reactions in the following experiments were also carried out by the said methods unless otherwise specified.

The concentration of the protein was determined by measuring absorption at 280 nm on a spectrophotometer.

Identification of β-Amylase

Figure 2:
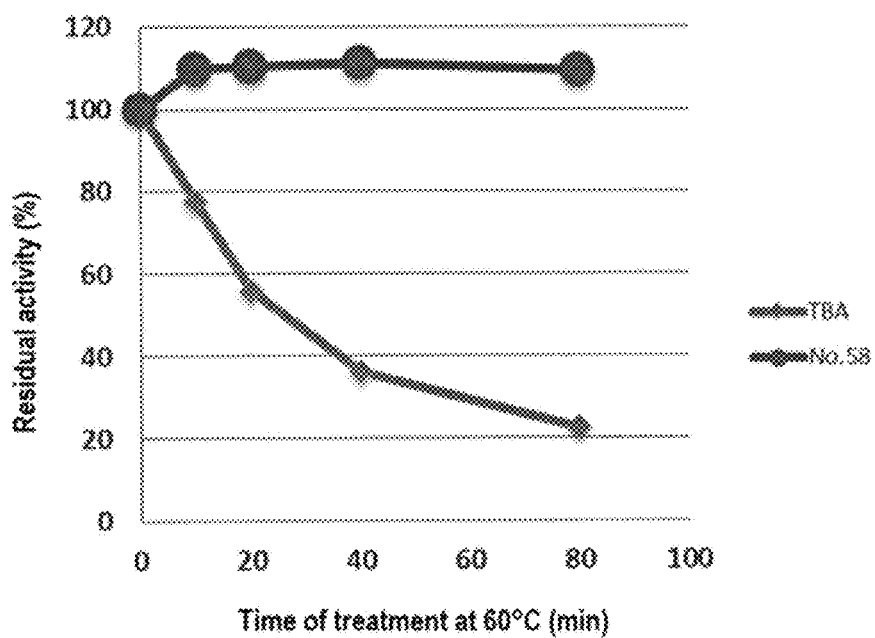
FIG. 2 shows temperature stability of amylase at 60° C. in a culture supernatant of the strain No. 58.

The amylase of the strain No. 58 obtained was evaluated for temperature stability. The strain No. 58 was cultured, and thereby collecting a culture supernatant to be used as a culture supernatant sample. An appropriately diluted culture supernatant sample was placed in a microtube and sampled after incubation at 60° C. for 10, 20, 40, and 80 minutes. The samples were cooled on ice. The residual enzyme activity in the cooled samples was determined by measuring the amount of the reducing sugars produced, thereby evaluating the temperature stability of the obtained amylase at 60° C. A sample was used as a control, which was treated with the β-amylase from Brevibacillus sp. TMK-672 strain (TBA strain) in the same manner. The results are shown in FIG. 2. The data are expressed as relative values with the value at treatment time of 0 minute as 100%. In FIG. 2, No. 58 indicates the strain of the present invention and TBA indicates a comparative strain. Further, to confirm whether the obtained amylase is a β-amylase, a relationship was determined between the amount of reducing sugar produced and the relative $KI/I_2$ value.

The relative $KI/I_2$ value was determined as follows.

Figure 3:
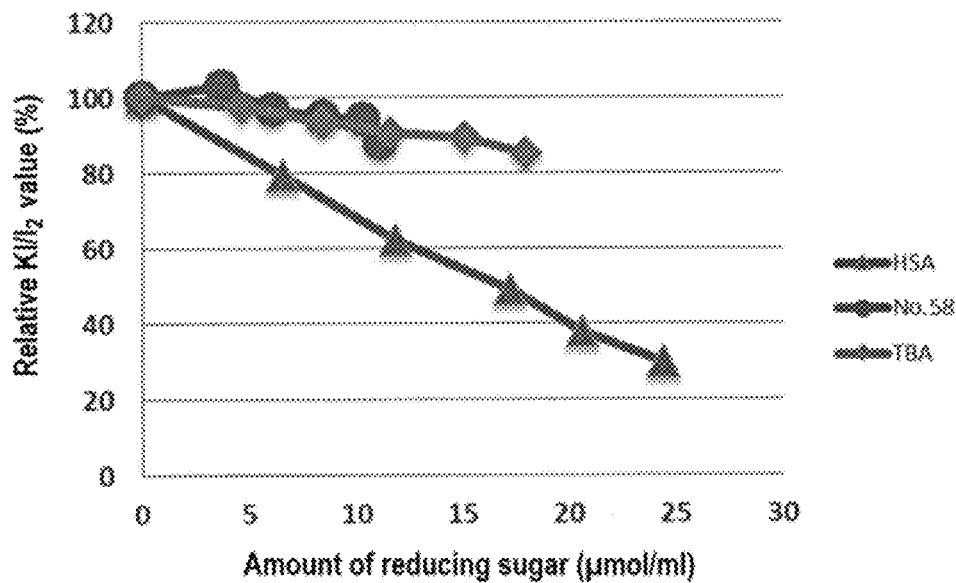
FIG. 3 shows a relationship between the amount of reducing sugars produced and the relative $KI/I_2$ value for various amylases.

In a test tube, 200 μl of the enzyme solution was taken and pre-incubated at 37° C. for 10 minutes, and then 400 μl of the substrate solution also pre-incubated was added thereto to react at 37° C. for 10 minutes. The reaction was stopped by adding 1 ml of a reaction stop solution (a 5:1 mixture of 0.5 N acetic acid and 0.5 N HCl). In another test tube, 200 μl of the reaction solution after stopping the reaction was taken and 5 ml of an iodine solution (0.005% $I_2$, 0.05% KI) was added thereto. After 20 minutes, absorption at 660 nm was measured on a spectrophotometer. A relative $KI/I_2$ value when the amount of reducing sugars was 0 was set to 100%. The values obtained with changing the concentration of the samples measured were plotted against the value obtained by the said reducing sugar quantification method. Human salivary α-amylase and the β-amylase from TMK-672 strain were used as positive controls of α-amylase and β-amylase, respectively, for comparison to determine if the amylase from the obtained strain is a β-amylase was determined. The results are shown in FIG. 3. In FIG. 3, HSA indicates human salivary α-amylase.

The results in FIG. 2 reveals that the enzyme from the strain No. 58 has very high temperature stability with no decrease in activity occurring within the time examined. In FIG. 3, the plots obtained with the enzyme from the strain No. 58 are compared to the plots obtained with the β-amylase from TMK-672 strain, revealing that the present enzyme is a β-amylase cleaving starch chains into maltose units from their non-reducing end.

Preparation of Chromosomal DNA

The strain No. 58 was inoculated into 100 ml of a 2×TY liquid medium (Table 2) to culture at 37° C. for 2 days, and the bacterial cells were collected by centrifugation (6,000 rpm, 10 min, 4° C.). Next, the cells were suspended in 9 ml of Solution I (50 mM glucose, 25 mM Tris-HCl, EDTA, pH 8.0) and incubated with several mg of lysozyme added at 37° C. for 2 hours or more.

TABLE 2

The composition of the 2 × TY medium

| Peptone | 1.6% |
|---|---|
| Yeast extract | 1.0% |
| Sodium chloride | 0.5% |

The pH was adjusted to 7.0.

In some experiments, ampicillin was added to the medium at 100 pig/ml composition.

Then, to the Solution I with cultured cells, a 10% SDS solution was added at a final concentration of 0.5%, followed by shaking for 10 minutes. To the mixture, a 5 M NaCl solution was further added at a final concentration of 0.7 M or more, followed by shaking for 10 minutes. Thereafter, phenol/chloroform extraction was carried out by centrifuging the obtained solution having phenol/chloroform added (13,500 rpm, 10 min, 4° C.) to separate into an aqueous layer, which was recovered, and an oil layer. To the recovered solution thus obtained, 12 ml of ice-cold 2-propanol was added. After mixing by inversion, DNA precipitates were collected by suction with a Pasteur pipette. The DNA was rinsed twice with 30 ml of 70% ethanol, then transferred to a new tube, dried under reduced pressure, and then suspended in 500 μl of a TE buffer (10 mM Tris-HCl, 1 mM EDTA, pH 8.0). The suspension was incubated with 5 μl of an RNase A solution (10 mg/ml) added at 37° C. for 30 minutes, and then was again subjected to phenol/chloroform extraction. To the recovered solution was added 50 μl of 3 M sodium acetate and 500 μl of ice-cold 2-propanol, and the mixture was left on ice for 10 minutes. The DNA precipitates were collected by suction with a Pasteur pipette, rinsed twice with 1 ml of 70% ethanol, then transferred to an empty tube, dried under reduced pressure, and dissolved in 300 μl of TE buffer.

Acquisition and Analysis of 16S rRNA

The 16S rRNA gene was amplified by PCR. As a template, the extracted chromosomal DNA was used. The following primers designed based on highly conserved regions in the bacterial 16S rRNA gene were used: a forward primer (5'-AGRRTTTGATYHTGGYTCAG 3': SEQ ID NO: 3) and a reverse primer (5'-TGACGGGCGGTGTGTACAAG-3': SEQ ID NO: 4). The PCR amplification of the 16S rRNA region was carried out using PrimeSTAR HS DNA polymerase (Takara Bio Inc.), and the temperature cycles used were 30 cycles of 98° C. for 10 seconds, 55° C. for 5 seconds, and 72° C. for 90 seconds. The obtained PCR product was inserted into EcoR V-digested pBluescript II SK (+) (Stratagene), which was then transformed into *E. coli*, followed by extracting the plasmid therefrom. Sequence analysis was performed by Eurofins Genomics K. K. The nucleic acid sequence was analyzed with GENETYX-WIN Ver. 7 (Genetics), and the identity of the nucleic acid sequence was searched using BLAST search at NCBI (www.ncbi.nlm.nih.gov/).

These analyses identified the strain No. 58 of the present invention as *Bacillus halosaccharovorans* strain No. 58 (the strain No. 58). This strain was deposited at the National Institute of Technology and Evaluation, Patent Microorganisms Depositary (Room 122, 2-5-8, Kazusakamatari, Kisarazu-shi, Chiba) on Apr. 12, 2019. The accession number is NITE BP-02937.

Experiment 2: Purification of β-Amylase

Mass Culture of the Strain No. 58 and Acquisition of Crude Enzyme Solution

In eight 2.0-L conical flasks each containing 650 ml of a medium for amylase-producing bacteria, the composition of which was changed to 1.5% dextrin, 0.3% peptone, 0.3% yeast extract, and 0.3% $CaCl_2$, 6.5 ml of a medium fluid with strain No. 58 shaking-cultured at 45° C. for 48 hours was inoculated and subjected to shaking culture at 45° C. for 48 hours. The culture fluid of the strain No. 58 was centrifuged (9,000 rpm, 60 min, 4° C.) to recover the culture supernatant, which was used as a crude enzyme solution.

The concentration of the protein was determined by measuring absorption at 280 nm on a spectrophotometer.

Purification with TOYOPEARL Butyl-650M Column

To 5.0 L of the obtained culture supernatant, 570 g of ammonium sulfate was added and dissolved by small amounts while stirring to give a 20%-saturated solution. After dissolution, the supernatant was collected by centrifugation (10,800 rpm, 60 min, 4° C.). The collected supernatant was run on 100 ml of TOYOPEARL Butyl-650M equilibrated with 20 mM Tris-HCl buffer (pH 7.0) containing 20% saturated ammonium sulfate and the column was washed with 2.0 L of the same buffer. The adsorbed substances were eluted with a reverse linear gradient (1.0 L) of 20 mM Tris-HCl buffer (pH 7.0) containing 20-0% saturated ammonium sulfate, and the eluent was fractionated in 10 ml aliquots. Activity of each fraction was measured and the fraction with β-amylase activity was collected, to which ammonium sulfate was added and dissolved to 80% saturation, forming precipitates at 4° C. overnight. The precipitates collected by centrifugation (10,800 rpm, 30 min, 4° C.) were dissolved in a small amount of 20 mM Tris HCl buffer (pH 7.0) and dialyzed against a large excess amount of 20 mM Tris-HCl buffer (pH 7.0) using a dialysis membrane.

Purification with TOYOPEARL DEAE-650M Column

The dialyzed sample was run on TOYOPEARL DEAE-650M (100 ml) equilibrated with 20 mM Tris-HCl buffer (pH 7.0) and the column was washed with 500 ml of the same buffer. The adsorbed substances were eluted with a linear gradient (1.0 L) of 20 mM Tris-HCl buffer (pH 7.0) containing 0-300 mM NaCl, and the eluent was fractionated in 10 ml aliquots. Activity of each fraction was measured and the fraction with β-amylase activity was collected. The precipitates by ammonium sulfate were dialyzed against a large excess of 20 mM Tris-HCl buffer (pH 7.0).

SDS-PAGE

SDS-PAGE was carried out according to the method of Laemmli (Laemmli U.K., Nature, 227, 680-685, 1970).

A polyacrylamide gel (acrylamide:N,N'-methylenebisacrylamide=29.2:0.8) of 12.5% separation gel and 5.0% concentration gel was prepared. The sample was added with 6× sample buffer (0.375 M Tris-HCl, 60% glycerol, 6% 2-mercaptoethanol, 0.003% bromophenol blue, pH 6.8), and treated at 100° C. for 10 min. The heated sample with added 6× sample buffer was leaded on the polyacrylamide gel, and electrophoresed on a vertical slab electrophoresis system (ATTO CORPORATION) in a running buffer (0.1% SDS, 25 mM Tris, 192 mM glycine) at a constant current of 20 mA. After electrophoresis, the gel was stained with a CBB solution (0.2% Coomassie Brilliant Blue R-250, 50% ethanol, 10% acetic acid), and then decolored with a decoloring solution (10% methanol, 7.5% acetic acid). Protein Molecular Weight Marker (Broad) (Takara Bio Inc.) was used as molecular weight markers for proteins.

The results from a series of the purification experiments are shown in Table 3.

TABLE 3

| | Total activity (U) | Total protein ($A_{280}$) | Specific activity (units/$A_{280}$) | Activity (units/ml) | Yield (%) | Fold |
|---|---|---|---|---|---|---|
| Crude enzyme solution | 308000 | 79200 | 3.89 | 62.3 | 100 | — |
| Butyl-Toyopearl | 239000 | 217 | 1100 | 796 | 77.6 | 283 |
| DEAE-Toyopearl | 221000 | 51.4 | 4300 | 2510 | 71.8 | 1110 |

Figure 4:
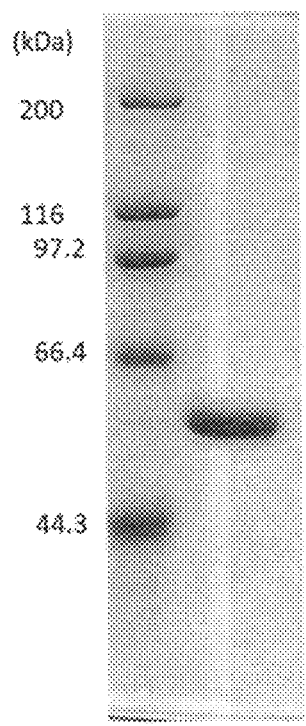
FIG. 4 shows results of SDS-PAGE of purified β-amylase.

The SDS-PAGE results of the enzymes purified in the purification experiments are shown in FIG. 4. FIG. 4 shows that a single band was obtained by purification at a molecular weight of 59.4 kDa, indicating that the enzyme was purified as a single enzyme. The obtained purified enzyme was used in the following experiments.

Experiment 3: Beta Amylase Sequence Analysis
N-Terminal Amino Acid Sequence Analysis After performing SDS-PAGE of the purified preparation, the gel was gently shaken in blotting solution C (0.02% SDS, 25 mM Tris, 20% methanol, 25 mM boric acid) for 5 minutes. Six gel-sized pieces of filter paper were prepared, and two pieces each were soaked in blotting solution A (0.02% SDS, 300 mM Tris, 20% methanol), blotting solution B (0.02% SDS, 25 mM Tris, 20% methanol), or blotting solution C, with shaking for 15 minutes. In addition, a gel-sized PVDF membrane (MILLIPORE) was soaked in methanol with shaking for 10 minutes, and then in the blotting solution C for 15 minutes. Next, the two filter paper pieces (in blotting liquid C), the gel, the PVDF membrane, the two filter paper pieces (in blotting liquid B), and the two filter paper pieces (in blotting liquid A) were placed in this order from the negative electrode in a semi-dry blotting system (Bio-Rad Laboratories, Inc.), and the proteins were electrophoretically transferred to the PVDF membrane at a constant current of 2 mA per 1 cm² of the gel for 50 minutes. After the transfer, the PVDF membrane was gently washed with ultrapure water, then stained with Ponceau-S staining solution (0.1% Ponceau S, 5% acetic acid) for 5 minutes, followed by decoloration with ultrapure water. The band of interest was cut out and placed in a tube to dry. Sequence analysis was performed by the Global Facility Center, Hokkaido University (Instrumental Analysis Service).

The analysis revealed that the N-terminal amino acid sequence is $H_2N$-Glu-Ile-Lys-Thr-Asp-Tyr-Lys-Ala-Ser-Val-.

Cloning of β-Amylase Gene

The β-amylase gene was amplified by PCR. As a template, the chromosomal DNA from the strain No. 58, prepared by the method described in Experiment 1, was used. The following primers designed based on highly conserved regions in the bacterial β-amylase were used: a forward primer (5'-GTNTGGTGGGGNTAYGTNGA-3': SEQ ID NO: 5) and a reverse primer (5'-GGRTTRTTCATYTGC-CARTG-3': SEQ ID NO: 6). The PCR amplification was carried out using PrimeSTAR HS DNA polymerase (Takara Bio Inc.), and the temperature cycles used were 30 cycles of 98° C. for 10 seconds, 55° C. for 5 seconds, and 72° C. for 50 seconds. The obtained PCR product was ligated to EcoR V-digested pBluescript II SK(-), which was in turn transformed into *E. coli*. The cells thus obtained were inoculated into 2 ml of 2×TY medium (with 100 pig/ml ampicillin) and cultured with shaking at 30° C. for 24 hours. The plasmid was extracted from the transformed *E. coli*, and subjected to sequence analysis to confirm that the β-amylase sequence was contained in the plasmid. Using the plasmid containing the obtained gene as a template, a DIG (digoxigenin)-labeled probe was synthesized with the following primers designed from the β-amylase gene sequence determined: PS-F (5'-GGCAGCCCAGGTAATTTCTAC-3': SEQ ID NO: 7) and PS-R (5'-GGAGGGTTGACTTCACTCCA-3': SEQ ID NO: 8). The genomic DNA of the strain No. 58 was digested overnight with a respective combination of 10 restriction enzymes (Sac I, BamH I, Xba I, Sal I, Sph I, Hind III, Bgl II, Spe I, Nhe I, Xho I) with the enzymes EcoR I and Kpn I, whose cleavage sites are present in the obtained gene, and Southern blot analysis was then carried out with the synthesized probe. From the analysis, it was expected that the Bgl II-digested gene fragment of about 6.3 kb contained the full length of the target gene. Therefore, the Bgl II-digested gene fragment was collected from the band with a size corresponding to about 6.3 kb and ligated into BamH I-digested pBluescript II SK(-), which was then transformed into *E. coli*. The plasmid containing the target gene was obtained by PCR screening with the primers used for preparing the probe. The obtained plasmid was digested with various restriction enzymes and subcloned into pBluescript II SK(-), followed by sequence analysis.

Figure 5:
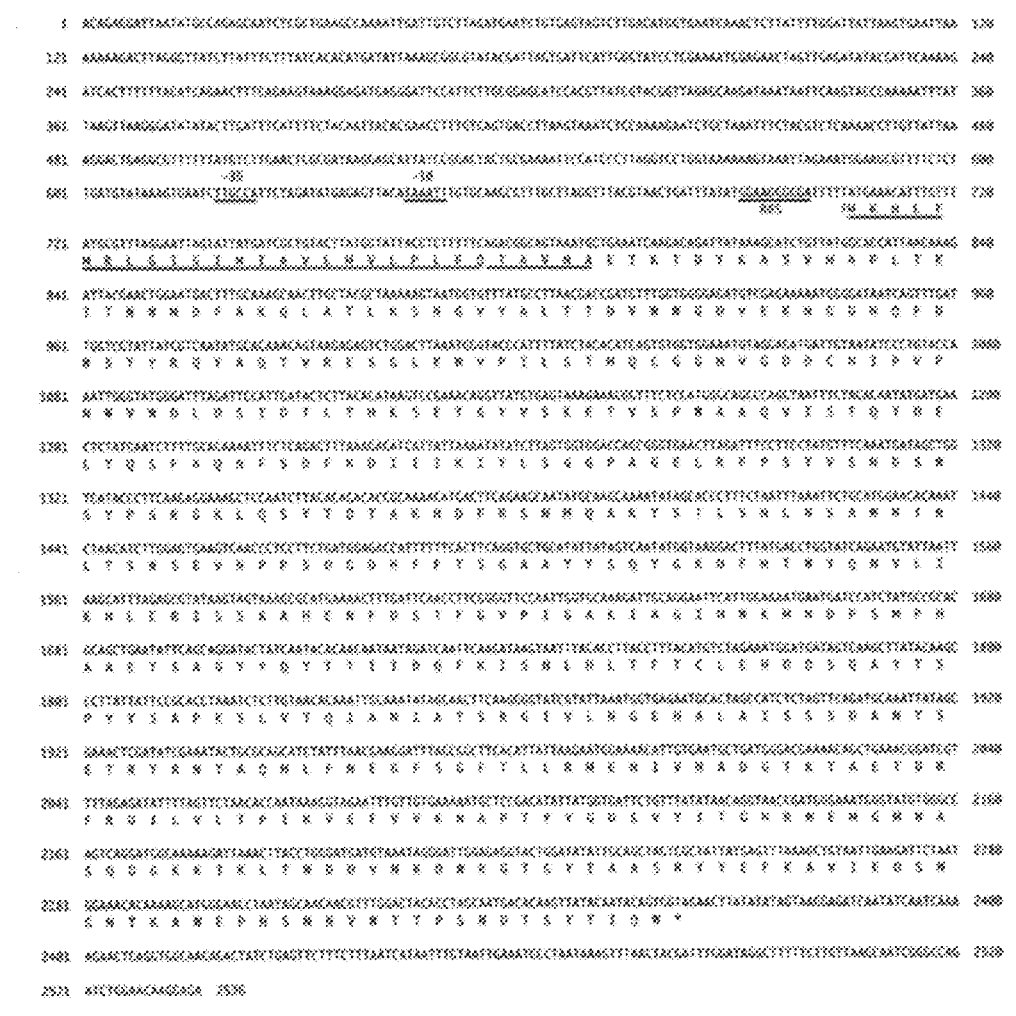

The results of the sequence analysis are shown in FIG. 5. It was found that the obtained sequence consists of 2,536 bp (SEQ ID NO: 11), wherein the present gene was composed of an open reading frame (ORF) of 1,659 bp (SEQ ID NO: 1) and a promoter region is present and composed of a ribosome binding site (RBS) at 6 bp upstream, a -10 region at about 56 bp upstream, and a -35 region at about 82 bp upstream of the start codon.

The analysis of the putative amino acid sequence revealed that the gene is expressed as a precursor protein of 552 amino acids (SEQ ID NO: 12; the corresponding nucleic acid sequence, SEQ ID NO: 1). It is found that there exist the completely same sequence as the determined N-terminal amino acid sequence, and a signal sequence of 29 amino acids (underlined in the figure), which appears from the former sequence, and that the mature protein is composed of 523 amino acids and has a molecular weight of 59,403 calculated from the amino acid sequence (SEQ ID NO: 2, the corresponding nucleic acid sequence, SEQ ID NO: 13). It is also found that the mature protein is composed of a catalytic domain, which is classified into the Glycoside hydrolase family 14 (GH 14), in the N-terminal region and a substrate-binding domain, which is classified into the Carbohydrate-binding module 20 (CBM20), in the C-terminal side.

Figure 6:
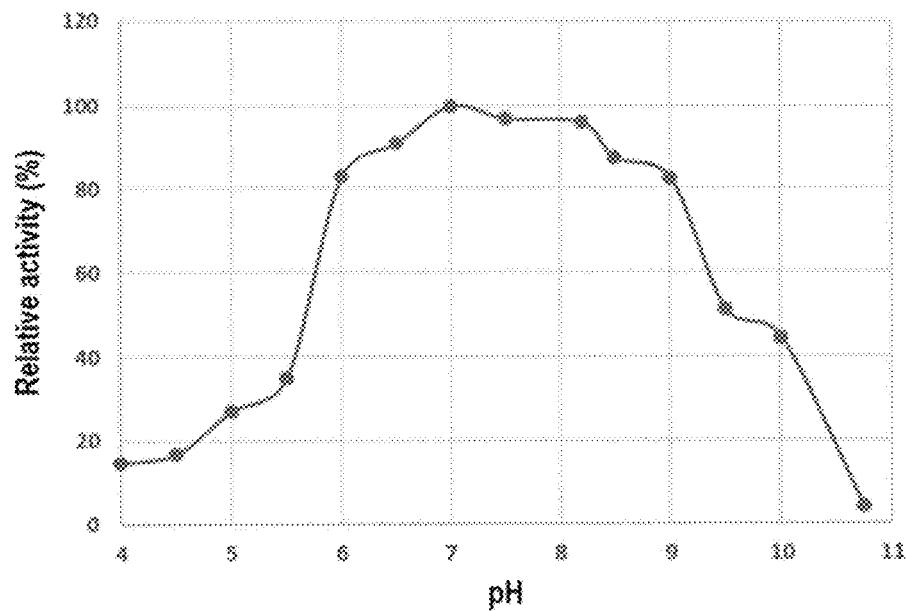
FIG. 6 is a graph showing the optimum pH of the β-amylase from the strain No. 58.
Figure 7:
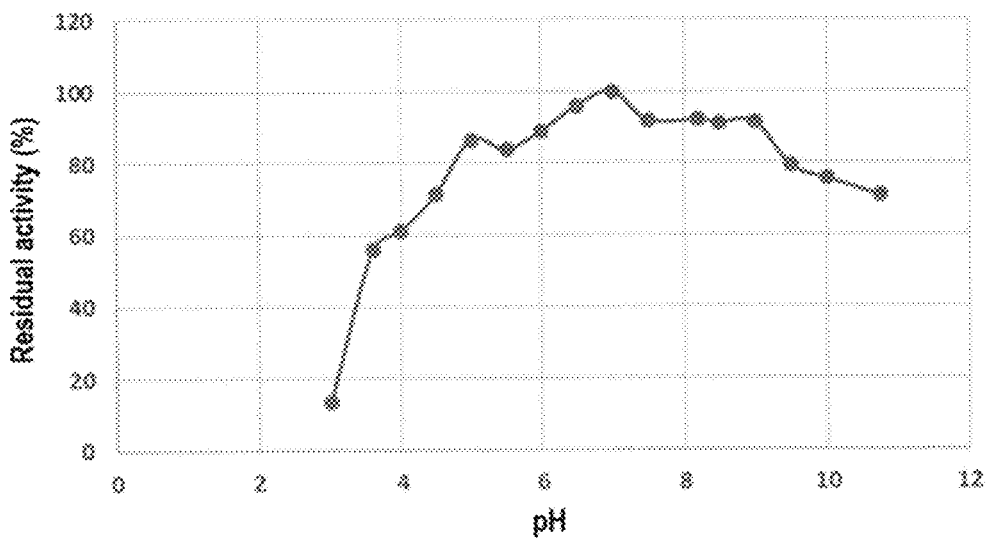
FIG. 7 is a graph showing pH stability of the β-amylase from the strain No. 58.

Experiment 4: Studies on the Properties of the β-Amylase
Optimum pH and pH Stability In order to determine the optimum pH of the β-amylase, the enzyme activity was measured by reacting the purified enzyme and the substrate in 50 mM universal buffer (McIlvaine buffer) at pH 4.0, 4.5, 5.0, 5.5, 6.0, 6.5, 7.0, 7.5, 8.2, 8.5, 9.0, 9.5, 10.0, or 10.75 in the same manner as described above for the measurement of amylase activity, except for pH. For pH stability, a respective mixture of the enzyme solution and added 50 mM universal buffer at pH 3.0, 3.5, 4.0, 4.5, 5.0, 5.5, 6.0, 6.5, 7.0, 7.5, 8.2, 8.5, 9.0, 9.5, 10.0, or 10.75 was allowed to stand at 4° C. for 16 hours. The mixed solutions were diluted 10 times with 100 mM Tris-HCl buffer (pH 7.0) to return the pH to 7.0. The residual activity was measured by reaction of the respective diluted mixtures at 37° C. for 10 minutes in the same manner as described above for the measurement of amylase activity. The measurement results of optimum pH and pH stability are shown in FIGS. 6 and 7, respectively. In FIGS. 6 and 7, the ordinate represents relative activity with the maximum activity measured as 100%. As seen from FIG. 6, the present enzyme exhibited the maximum activity at around pH 7.0. FIG. 7 revealed that the enzyme showed residual activity of 80% or more in the pH range of 5.0 to 9.0.

Optimum Temperature and Temperature Stability

Figure 8:
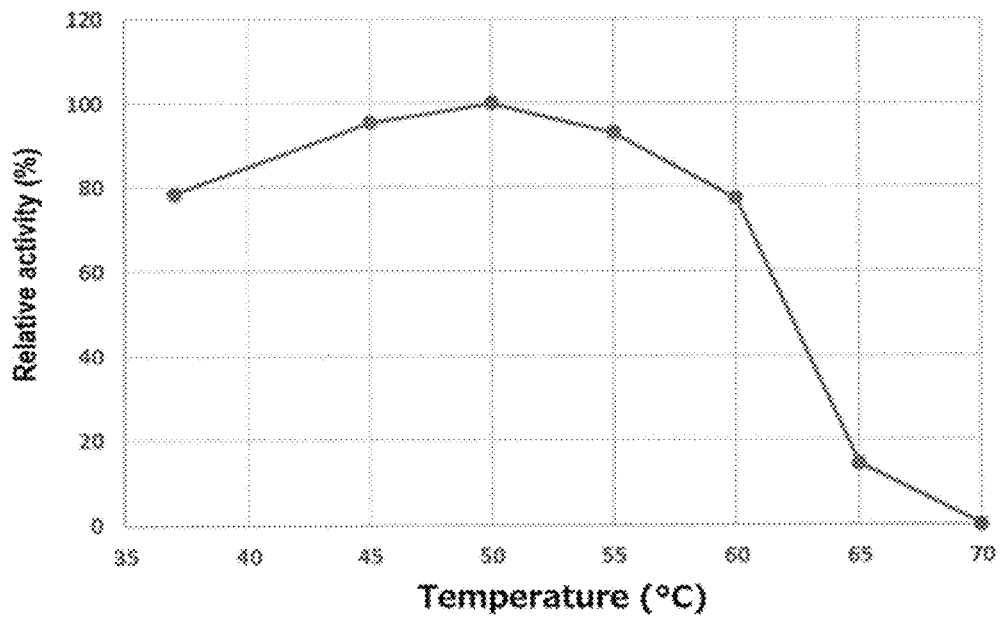
FIG. 8 is a graph showing the optimum temperature of the β-amylase from the strain No. 58.
Figure 9:
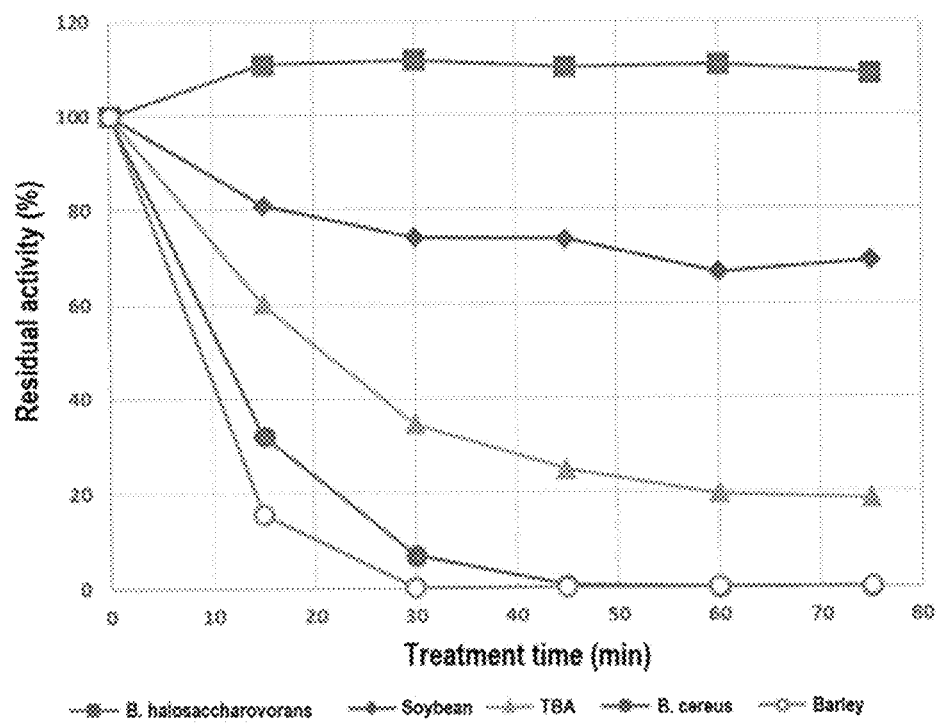
FIG. 9 shows the results of comparing residual activity of five β-amylases including the β-amylase from the strain No. 58, all heat-treated at 60° C.
Figure 10:
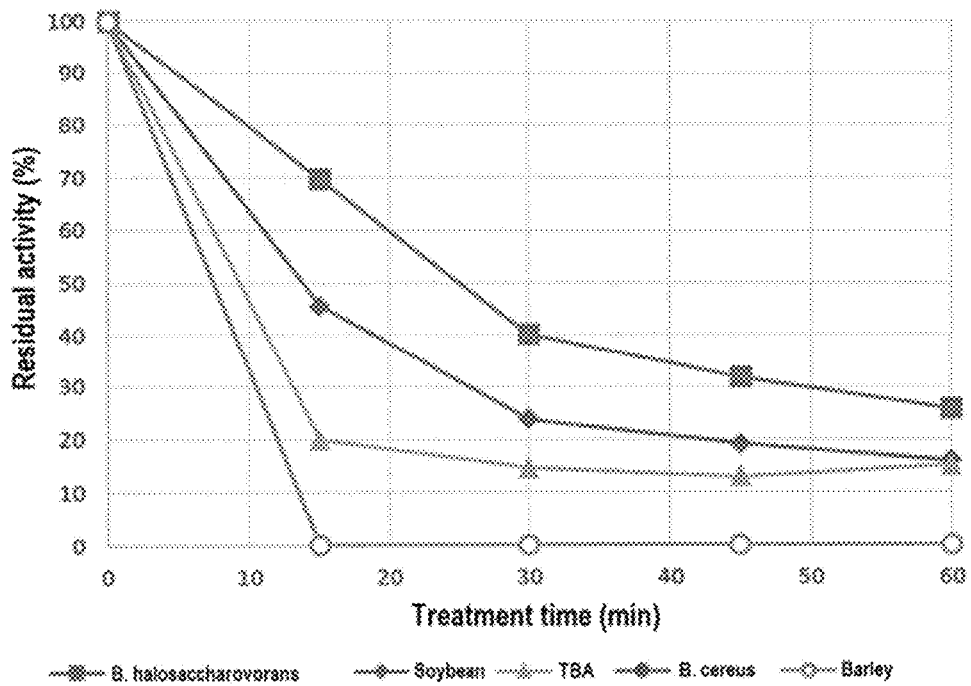
FIG. 10 shows the results of comparing residual activity of five β-amylases including the β-amylase from the strain No. 58, all heat-treated at 65° C.

In order to determine the optimum temperature of the β-amylase, the enzyme activity was measured by reacting the enzyme solution with the substrate for 10 minutes at a temperature of 37 to 70° C. in the same manner as described above for the measurement of amylase activity, except for temperature. For temperature stability, the residual activity of the enzyme solution (20 mM Tris-HCl buffer, pH 7.0) was measured, which solution had been treated at 37, 45, 50, 55, 60, 65, or 70° C. for 30 minutes and then cooled before the reaction at 37° C. for 10 minutes in the same manner as described above for the measurement of amylase activity. For the treatments at 60° C. and 65° C., the residual activity was measured over a time course (15, 30, 45, 60, and 75 minutes) of treatment and compared with those of soybean β-amylase, β-amylase from *Brevibacillus* sp. TMK-672 strain, j-amylase from *Bacillus cereus*, and j-amylase from barley, measured in the same manner. FIG. 8 shows the measurement results of the optimum temperature. FIG. 9 shows the residual activities of the respective β-amylases at 60° C. FIG. 10 shows the residual activities of the respective β-amylases at 65° C. FIG. 8 shows the relative activity of the maximum activity measured (taken as 100%), at each temperature. In FIGS. 9 and 10, the values represent activities relative to the activity at treatment time of 0 minute (taken as 100%), over a time course of treatment. From FIG. 8, the optimum temperature of the present enzyme was found to be around 50° C. FIG. 9 shows that the activity was decreased in the order of β-amylase from *Brevibacillus* sp. TMK-672 strain, the β-amylase from *Bacillus cereus*, and barley j-amylase and that soybean β-amylase, which is known to have heat resistance, had a residual activity of about 80% after treatment for 60 to 80 minutes. On the other hand, the β-amylase from the strain No. 58 exhibited more excellent heat resistance than soybean β-amylase and retained a residual activity of 100% even after the heat treatment in this experiment. As can be seen from FIG. 10, the residual activity after treatment at 65° C. for 30 minutes was about 25% for the enzyme from soybean and about 40% for the enzyme from the strain No. 58. The data shows that the β-amylase of the present invention exhibits excellent heat resistance, even at 65° C., as compared with soybean β-amylase and the like.

Raw Starch Digesting Activity

Figure 11:
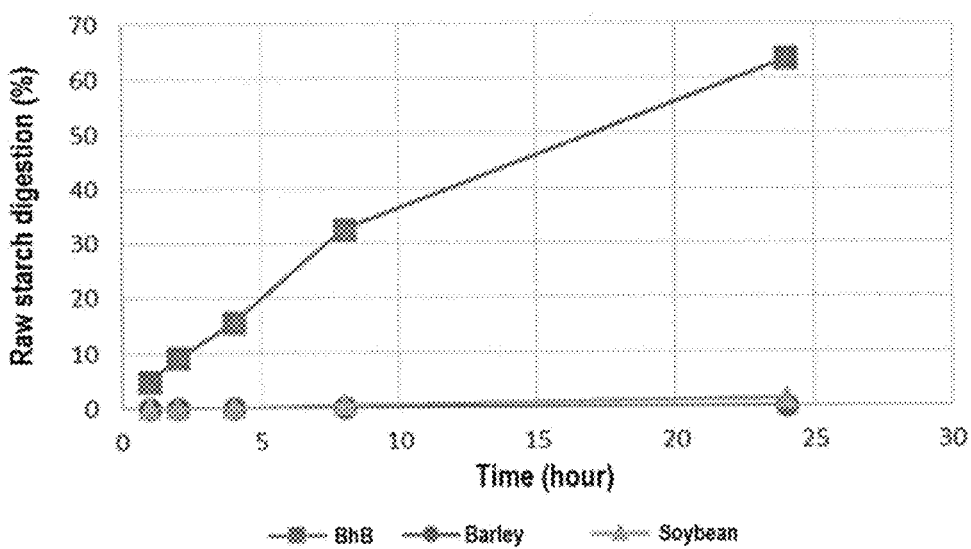
FIG. 11 is a graph showing percentage of digestion of raw wheat starch with each of three β-amylases including the β-amylase from the strain No. 58.
Figure 12:
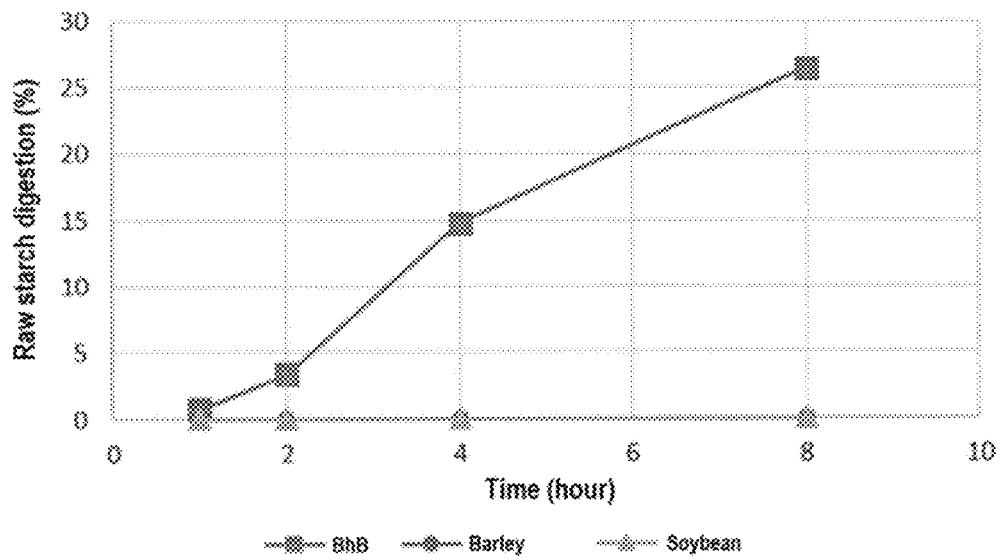
FIG. 12 is a graph showing percentage of digestion of raw corn starch with each of three β-amylases including the β-amylase from the strain No. 58.

Experiments were conducted to compare the digesting activities of 3-amylases on raw starch. The raw starches used were from corn and wheat. After reacting 1.0 mg/ml of each raw starch with 0.1 μg/ml of each enzyme in the presence of 20 mM Tris-HCl buffer (pH 7.0) and 5 mM $CaCl_2$ and then stopping the reaction by the addition of an appropriate amount of the reaction solution to a test tube containing a 0.4 ml DNS solution, the raw starch digesting activity was evaluated by the reducing sugar quantitative method described in Experiment 1. The β-amylase used were the β-amylase of the present invention, barley β-amylase, and soybean β-amylase. Barley (3-amylase is known to have the activity of digesting a raw starch, and soybean β-amylase is known to have a weak activity to digest a raw starch but high heat resistance. Wheat starch was reacted at 60° C., while corn starch was reacted at 70° C. The reaction results are shown in FIGS. 11 and 12 for wheat and corn starches, respectively. As can be seen from FIG. 11, barley β-amylase and soybean β-amylase had almost no digesting activity on raw wheat starch, while the β-amylase of the present invention digested the raw starch by 65% in 24 hours. As can be seen from FIG. 12, again, barley β-amylase and soybean β-amylase had almost no digesting activity on the corn starch, while the β-amylase of the present invention digested the raw starch by 27% in 8 hours. These results show that the present enzyme digested the raw starches well at high temperatures at which the barley enzyme, having a relatively high raw starch digesting activity, could not react with them. In addition, the soybean enzyme, having high temperature stability but a weak digesting ability on a raw starch, does not digest the raw starch. The results reveal that the β-amylase of the strain No. 58 has a high ability to digest raw starches and retains the activity at high temperature.

Experiment 5

Expression of β-Amylase Gene in *E. coli* The β-amylase gene from the strain No. 58 was heterologously expressed in *E. coli*. In order to express the β-amylase gene in *E. coli*, first, a DNA fragment containing the coding region for the β-amylase gene and a ribosome binding site was amplified by PCR using the plasmid containing the β-amylase gene as a template and the primers RBS-F (5'-CCGAGCTCCTCGAGGCGTTTGCTTAGGTTTACGTA-3': SEQ ID NO: 9) and exp-R (5'-CCCTGCAGGATCC-TACCACTGTATTGTATAACTTG-3': SEQ ID NO: 10). The amplified DNA fragment was cleaved with Xho I and Pst I, and the digested fragment was inserted into pBluescript SK(-) also digested with the same restriction enzymes. The plasmid was used to transform *E. coli* BL21 (DE3). The PCR conditions were the same as used in the method of Experiment 3. The obtained transformant was inoculated into 2 ml of 2×TY medium (with 100 pig/ml ampicillin) to culture with shaking at 30° C. for 24 hours. The bacterial cells collected by centrifugation (10,000 rpm, 2 min, 4° C.) were suspended in 1 ml of 20 mM Tris-HCl buffer, pH 7.0, 5 mM $CaCl_2$, and then ultrasonically disrupted 4 times for 30 seconds by using Handy sonic disruptor UD1 (TOMY SEIKO CO., LTD.). Amylase activity was measured on the supernatant, as a crude enzyme, obtained by centrifugation (15,000 rpm, 10 min, 4° C.) from the disrupted fluid and it was observed that reducing sugars were produced from soluble starches as substrates. The TLC detection confirmed that the reaction product was maltose only. The enzyme activity was 55.1 U/ml of culture fluid.

Experiment 6: Site-Directed Mutagenesis into β-Amylase Gene

Site-directed mutagenesis was performed on the β-amylase gene from the strain No. 58 to create variant enzymes, which were measured for enzyme activity.

The site-directed mutagenesis into the β-amylase gene was conducted out by the PCR-mega primer method. First, PCR was carried out in the same manner as in "Cloning of the β-amylase gene" using the plasmid containing the coding region for the β-amylase gene and the ribosome binding site, as a template, and the four mutagenic primers (SEQ ID NOs: 14 to 17) listed in Table 4 below and the exp-R primer (SEQ ID NO: 10), to obtain mega primers.

Next, another PCR was performed in the same manner using the obtained mega primers and the RBS-F primer (SEQ ID NO: 9) and using the plasmid containing the coding region for the β-amylase gene and the ribosome binding site as a template, thereby obtaining the full length of β-amylase genes having an introduced mutation. The genes were used in the same manner as used in Experiment 5 to construct expression plasmids, which were transformed into *E. coli* BL21 (DE3) strain to obtain transformants producing β-amylase variant enzymes.

TABLE 4

Primer for introducing mutation

| Primer | Sequence (5'→3') | SEQ ID No. |
|---|---|---|
| T4P-F | AATGCCGAAATCAAGCCAGATTATAAAGCATC | SEQ ID No. 14 |
| T15K-F | GTTATGGCACCATTAAAAAAGATTACGAACTGG | SEQ ID No. 15 |
| T15R-F | GTTATGGCACCATTACGCAAGATTACGAACTGG | SEQ ID No. 16 |
| Q306D-F | ATAGATCAATTCAAGGAsAGTAATTTACACCTT | SEQ ID No. 17 |

Figure 13:
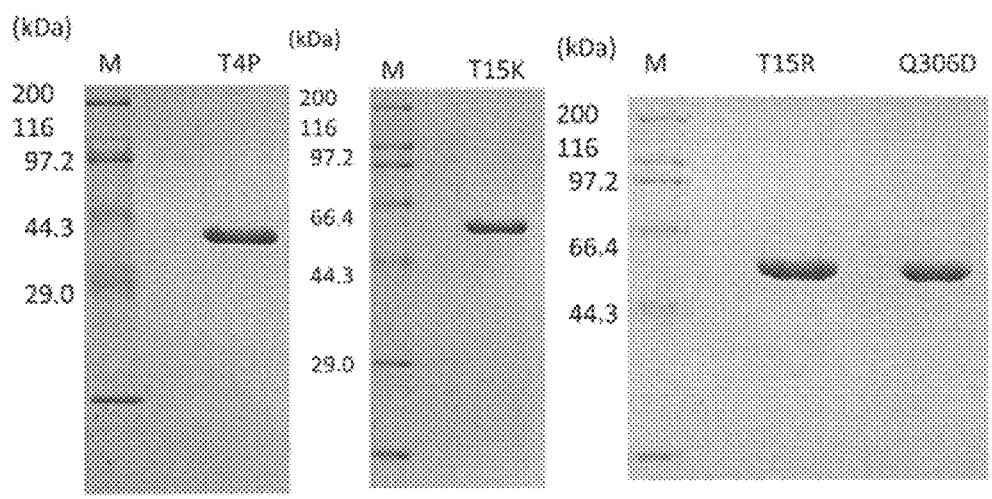
FIG. 13 shows the results of SDS-PAGE of purified β-amylase variants.

The obtained transformants were cultured in the same manner as used in Experiment 5, and then the cells were disrupted to obtain crude enzymes. The crude enzymes were used in the same manner as used in Experiment 2 to purify the enzymes. The purification results of the variant enzymes are shown in FIG. 13.

Figure 14:
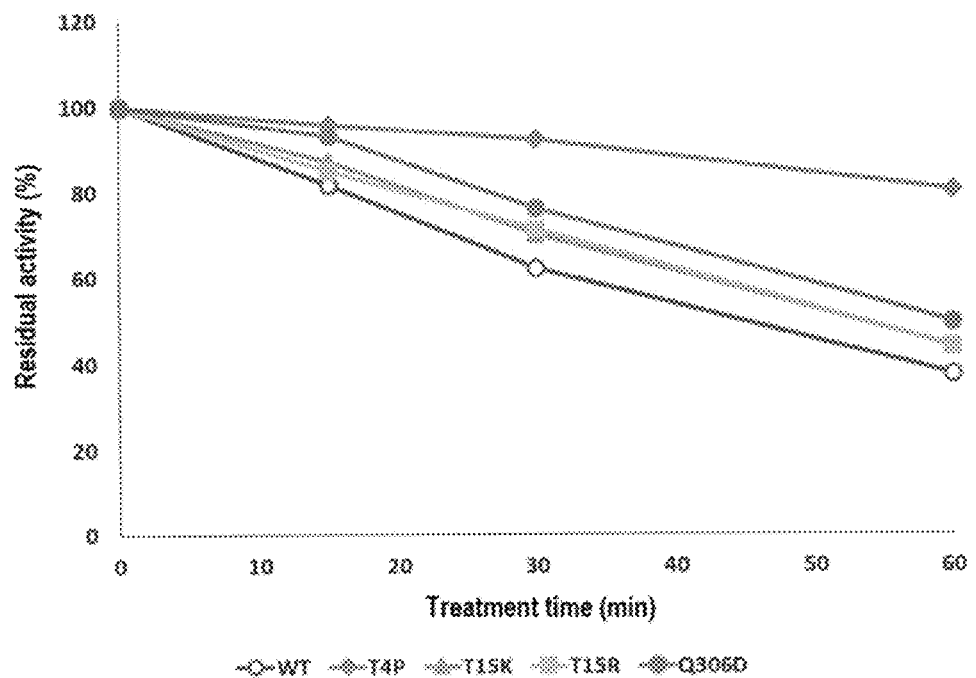
FIG. 14 shows temperature stability of β-amylase variants at 65° C.

The purified enzymes were evaluated for temperature stability in the same manner as used in "Identification of β-amylase". Each enzyme was placed and incubated at 65° C. in a microtube, from which samples were taken and cooled on ice after 15, 30, and 60 minutes of incubation. The residual enzyme activity of the cooled samples was determined by quantifying the amount of reducing sugars produced, thereby evaluating the temperature stability of the obtained amylases at 65° C. As a control, the unmutated purified enzyme was treated in the same manner to evaluate the temperature stability. The results are shown in FIG. 14. The data are expressed as relative values with the value at treatment time of 0 minute as 100%. In FIG. 14, wt represents the β-amylase of the strain No. 58 of the present invention, and T4P, T15K, T15R and Q306D represent variant enzymes (for example, T4P means mutation of amino acid residue 4 from T to P in the sequence SEQ ID NO: 2).

After 60 minutes of incubation, the residual activity of the unmutated β-amylase was 37.7%, whereas the activities of T4P, Q306DE, T15K and T15R were 80.9%, 50.1%, 44.4% and 44.2%, respectively, indicating that the obtained variant enzymes have improved thermal stability as compared with the unmutated β-amylase.

The variant β-amylases contained in the obtained four transformants have a mutation of amino acid residue 4 from threonine to proline (SEQ ID NO: 18; T4P in FIG. 14), a mutation of amino acid residue 15 from threonine to lysine (SEQ ID NO: 19; T15K in FIG. 14), a mutation of amino acid residue 15 from threonine to arginine (SEQ ID NO: 20; T15R in FIG. 14), or a mutation of amino acid residue 306 from glutamine to aspartic acid (SEQ ID NO: 21; Q306D in FIG. 14).

DEPOSIT INFORMATION

*Bacillus halosaccharovorans* strain No. 58 was deposited at the National Institute of Technology and Evaluation (NITE), Patent Microorganisms Depositary (Room 122, 2-5-8, Kazusakamatari, Kisarazu-shi, Chiba 292-0818 Japan) under the accession number NITE BP-02937 on Apr. 12, 2019. Applicant has or intends to comply with all the requirements set forth in 37 C.F.R. §§ 1.801-1.809.

The invention claimed is:

1. A vector comprising a nucleic acid sequence encoding, or an enzyme preparation comprising a β-amylase having:
   (i) the amino acid sequence set forth in SEQ ID NO. 2 or 12;
   (ii) the amino acid sequence set forth in SEQ ID NO. 2 or 12 except for one to nine amino acid deletions, substitutions, insertions and/or additions;
   (iii) an amino acid sequence having 90% or more sequence identity to SEQ ID NO. 2 or 12;
   (iv) the amino acid sequence set forth in any one of SEQ ID NOS. 18 to 25;
   (v) the amino acid sequence set forth in any one of SEQ ID NOS. 18 to 25 except for one to nine amino acid deletions, substitutions, insertions and/or additions; or
   (vi) an amino acid sequence having 90% or more sequence identity to the amino acid sequence set forth in any one of SEQ ID NOS. 18 to 25.

2. The vector according to claim 1, which comprises one or more substitutions selected from a threonine to proline substitution at a position corresponding to amino acid position 4, a threonine to lysine/arginine substitution at a position corresponding to amino acid position 15, and a glutamine to aspartic acid substitution at a position corresponding to amino acid position 306, with reference to the amino acid sequence set forth in SEQ ID NO. 2.

3. A microorganism carrying the vector according to claim 1.

4. A method of producing a β-amylase, the method comprising steps of: culturing the microorganism according to claim 3; and extracting the β-amylase from the culture.

5. A method of producing maltose, the method comprising a step of treating a starch with
   (i) a β-amylase or enzyme preparation comprising a β-amylase having the amino acid sequence set forth in SEQ ID NO. 2 or 12;
   (ii) a β-amylase or enzyme preparation comprising a β-amylase having the amino acid sequence set forth in SEQ ID NO. 2 or 12 except for one to nine amino acid deletions, substitutions, insertions and/or additions;
   (iii) a β-amylase or enzyme preparation comprising a β-amylase having the amino acid sequence having 90% or more sequence identity to SEQ ID NO. 2 or 12;
   (iv) a β-amylase or enzyme preparation comprising a β-amylase having the amino acid sequence set forth in any one of SEQ ID NOS. 18 to 25;
   (v) a β-amylase or enzyme preparation comprising a β-amylase having the amino acid sequence set forth in any one of SEQ ID NOS. 18 to 25 except for one to nine amino acid deletions, substitutions, insertions and/ or additions;
   (vi) a β-amylase or enzyme preparation comprising a β-amylase having an amino acid sequence having 90% or more sequence identity to the amino acid sequence set forth in any one of SEQ ID NOS. 18 to 25; or
   (vii) a vector or microorganism comprising a nucleic acid molecule encoding the β-amylase of one of (i)-(vi).

6. The method according to claim 5, wherein the β-amylase, enzyme preparation comprising a β-amylase, microorganism, or vector is added to the starch at a temperature of 60° C. or more to 70° C. or less.

7. The method according to claim 6, wherein the starch is a raw starch.

8. A method of modifying a food product, the method comprising a step of treating the food product with
   (i) a β-amylase or enzyme preparation comprising a β-amylase having the amino acid sequence set forth in SEQ ID NO. 2 or 12;
   (ii) a β-amylase or enzyme preparation comprising a β-amylase having the amino acid sequence set forth in SEQ ID NO. 2 or 12 except for one to nine amino acid deletions, substitutions, insertions and/or additions;
   (iii) a β-amylase or enzyme preparation comprising a β-amylase having an amino acid sequence having 90% or more sequence identity to SEQ ID NO. 2 or 12;
   (iv) a β-amylase or enzyme preparation comprising a β-amylase having the amino acid sequence set forth in any one of SEQ ID NOS. 18 to 25;
   (v) a β-amylase or enzyme preparation comprising a β-amylase having the amino acid sequence set forth in any one of SEQ ID NOS. 18 to 25 except for one to nine amino acid deletions, substitutions, insertions and/ or additions;
   (vi) a β-amylase or enzyme preparation comprising a β-amylase having an amino acid sequence having 90% or more sequence identity to the amino acid sequence set forth in any one of SEQ ID NOS. 18 to 25; or
   (vii) a vector or microorganism comprising a nucleic acid molecule encoding the β-amylase of one of (i)-(vi).

9. The enzyme preparation according to claim 1, and further comprising an additive selected from the group consisting of binders, fillers, disintegrants, non-aqueous excipients, preservatives, pH adjusters, thickeners, antioxidants, perfumes, emulsifiers, raising agents, and suspending agents.

10. The enzyme preparation according to claim 1, and further comprising another enzyme is selected from the group consisting of debranching enzymes, isoamylases, pullulanases, glucosidases, glucoamylases, α-amylases, proteases, lipases, phosphatases, and xylanases.

11. The method according to claim 5, wherein the β-amylase comprises one or more substitutions selected from a threonine to proline substitution at a position corresponding to amino acid position 4, a threonine to lysine/arginine substitution at a position corresponding to amino acid position 15, and a glutamine to aspartic acid substitution at a position corresponding to amino acid position 306, with reference to the amino acid sequence set forth in SEQ ID NO. 2.

12. The method according to claim 5, wherein the β-amylase retains at least 80% of β-amylase activity after heat treatment at 60° C. for 10 minutes, as compared to a corresponding unheated β-amylase.

13. The method according to claim 5, wherein the β-amylase is carried by a bacteria strain identified by the accession number NITE BP-02937.

14. The method according to claim 8, wherein the β-amylase comprises one or more substitutions selected from a threonine to proline substitution at a position corresponding to amino acid position 4, a threonine to lysine/arginine substitution at a position corresponding to amino acid position 15, and a glutamine to aspartic acid substitution at a position corresponding to amino acid position 306, with reference to the amino acid sequence set forth in SEQ ID NO. 2.

15. The method according to claim 8, wherein the β-amylase retains at least 80% of β-amylase activity after heat treatment at 60° C. for 10 minutes, as compared to a corresponding unheated β-amylase.

16. The method according to claim 15, wherein the β-amylase, microorganism, or vector is added to the food at a temperature of 60° C. or more to 70° C. or less.

17. The method according to claim 15, wherein the β-amylase is carried by a bacteria strain identified by the accession number NITE BP-02937.

18. The method according to claim 15, wherein the food product comprises a polysaccharide having an α-1,4 glucosidic bond.

19. The method according to claim 18, wherein the polysaccharide is a starch.

20. The method according to claim 19, wherein the starch is a raw starch.

* * * * *

SEQUENCE LISTING

```
<160> NUMBER OF SEQ ID NOS: 33

<210> SEQ ID NO 1
<211> LENGTH: 1659
<212> TYPE: DNA
<213> ORGANISM: Bacillus halosaccharovorans

<400> SEQUENCE: 1
atgaaacatt tgtttatgcg tttaggaatt agtattatga tcgctgtact tatggtatta      60 cctcttttc  agacggcagt aaatgctgaa atcaagacag attataaagc atctgttatg     120
gcaccattaa caaagattac gaactggaat gactttgcaa agcaacttgc tacgctaaaa     180
```

```
agtaatggtg tttatgcctt aacgaccgat gtttggtggg gagatgtcga gaaaaatggg      240
gataatcagt ttgattggtc gtattatcgt caatatgcac aaacagtaag agagtctgga      300
cttaaatggg tacccatttt atctacacat cagtgtggtg gaaatgtagg agatgattgt      360
aatatccctg taccaaattg ggtatgggat ttagattcca ttgatactct tacacataag      420
tccgaaacag gttatgtgag taaagaaacg gtttctccat gggcagccca ggtaatttct      480
acacaatatg atgaactcta tcaatctttt gcacaaaatt tctcagactt taaagacatc      540
attattaaaa tatatcttag tggtggacca gcgggtgaac ttagatttcc ttcctatgtt      600
tcaaatgata gctggtcata cccttcaaga ggaaagctcc aatcttacac agacaccgca      660
aaacatgact tcagaagcaa tatgcaagca aaatatagca ccctttctaa tttaaattct      720
gcatggaaca caaatctaac atcttggagt gaagtcaacc ctccttctga tggagaccat      780
tttttcactt caggtgctgc atattatagt caatatggta aggactttat gacctggtat      840
cagaatgtat taattaagca tttagagcgt ataagtagta aagcgcatga aaactttgat      900
tcaaccttcg gggttccaat tggtgcaaag attgcaggaa ttcattggaa atgaatgat       960 ccatctatgc cgcacgcagc tgaatattca gcaggatact atcaatacac aacaataata     1020
gatcaattca agataagtaa tttacaccctt acctttacat gtctagaaat ggatgatagt     1080
caagcttata caagcccta ttattccgca cctaaatctc ttgtaacaca aattgcaaat     1140
atagcaactt caaggggtat cgtattaaat ggtgagaatg cactagccat ctctagttca     1200
gatgcaaatt atagcgaaac tcgatatcga aatactgcgc agcatctatt taacgaagga     1260
tttagcggct tcacattatt aagaatggaa aacattgtga atgctgatgg gacgaaaaca     1320
gctgaaacgg atcgttttag agatatttta gttctaacac caataaaggt agaatttgtt     1380
gtgaaaaatg ctccgacata ttatggtgat tctgtttata taacaggtaa ccgatgggaa     1440
atgggtatgt gggccagtca ggatggcaaa aagattaaac ttacctggga tgatgtaaat     1500
agggattgga gaggtactgg atatattgca gctagtcgct attatgagtt taaagctgta     1560
attgaagatt ctaatggaaa cacaaaagca tgggaaccta atagcaacaa cgtttggact     1620
acacctagca atgacacaag ttatacaata cagtggtag                            1659
```

<210> SEQ ID NO 2
<211> LENGTH: 523
<212> TYPE: PRT
<213> ORGANISM: Bacillus halosaccharovorans

<400> SEQUENCE: 2

```
Glu Ile Lys Thr Asp Tyr Lys Ala Ser Val Met Ala Pro Leu Thr Lys
1               5                   10                  15

Ile Thr Asn Trp Asn Asp Phe Ala Lys Gln Leu Ala Thr Leu Lys Ser
            20                  25                  30

Asn Gly Val Tyr Ala Leu Thr Thr Asp Val Trp Trp Gly Asp Val Glu
        35                  40                  45

Lys Asn Gly Asp Asn Gln Phe Asp Trp Ser Tyr Tyr Arg Gln Tyr Ala
    50                  55                  60

Gln Thr Val Arg Glu Ser Gly Leu Lys Trp Val Pro Ile Leu Ser Thr
65                  70                  75                  80

His Gln Cys Gly Gly Asn Val Gly Asp Asp Cys Asn Ile Pro Val Pro
                85                  90                  95

Asn Trp Val Trp Asp Leu Asp Ser Ile Asp Thr Leu Thr His Lys Ser
            100                 105                 110
```

```
Glu Thr Gly Tyr Val Ser Lys Glu Thr Val Ser Pro Trp Ala Ala Gln
            115                 120                 125

Val Ile Ser Thr Gln Tyr Asp Glu Leu Tyr Gln Ser Phe Ala Gln Asn
    130                 135                 140

Phe Ser Asp Phe Lys Asp Ile Ile Lys Ile Tyr Leu Ser Gly Gly
145                 150                 155                 160

Pro Ala Gly Glu Leu Arg Phe Pro Ser Tyr Val Ser Asn Asp Ser Trp
                165                 170                 175

Ser Tyr Pro Ser Arg Gly Lys Leu Gln Ser Tyr Thr Asp Thr Ala Lys
            180                 185                 190

His Asp Phe Arg Ser Asn Met Gln Ala Lys Tyr Ser Thr Leu Ser Asn
            195                 200                 205

Leu Asn Ser Ala Trp Asn Thr Asn Leu Thr Ser Trp Ser Glu Val Asn
210                 215                 220

Pro Pro Ser Asp Gly Asp His Phe Phe Thr Ser Gly Ala Ala Tyr Tyr
225                 230                 235                 240

Ser Gln Tyr Gly Lys Asp Phe Met Thr Trp Tyr Gln Asn Val Leu Ile
                245                 250                 255

Lys His Leu Glu Arg Ile Ser Ser Lys Ala His Glu Asn Phe Asp Ser
            260                 265                 270

Thr Phe Gly Val Pro Ile Gly Ala Lys Ile Ala Gly Ile His Trp Lys
            275                 280                 285

Met Asn Asp Pro Ser Met Pro His Ala Ala Glu Tyr Ser Ala Gly Tyr
    290                 295                 300

Tyr Gln Tyr Thr Thr Ile Ile Asp Gln Phe Lys Ile Ser Asn Leu His
305                 310                 315                 320

Leu Thr Phe Thr Cys Leu Glu Met Asp Asp Ser Gln Ala Tyr Thr Ser
                325                 330                 335

Pro Tyr Tyr Ser Ala Pro Lys Ser Leu Val Thr Gln Ile Ala Asn Ile
            340                 345                 350

Ala Thr Ser Arg Gly Ile Val Leu Asn Gly Glu Asn Ala Leu Ala Ile
            355                 360                 365

Ser Ser Ser Asp Ala Asn Tyr Ser Glu Thr Arg Tyr Arg Asn Thr Ala
370                 375                 380

Gln His Leu Phe Asn Glu Gly Phe Ser Gly Phe Thr Leu Leu Arg Met
385                 390                 395                 400

Glu Asn Ile Val Asn Ala Asp Gly Thr Lys Thr Ala Glu Thr Asp Arg
                405                 410                 415

Phe Arg Asp Ile Leu Val Leu Thr Pro Ile Lys Val Glu Phe Val Val
            420                 425                 430

Lys Asn Ala Pro Thr Tyr Tyr Gly Asp Ser Val Tyr Ile Thr Gly Asn
            435                 440                 445

Arg Trp Glu Met Gly Met Trp Ala Ser Gln Asp Gly Lys Lys Ile Lys
    450                 455                 460

Leu Thr Trp Asp Asp Val Asn Arg Asp Trp Arg Gly Thr Gly Tyr Ile
465                 470                 475                 480

Ala Ala Ser Arg Tyr Tyr Glu Phe Lys Ala Val Ile Glu Asp Ser Asn
                485                 490                 495

Gly Asn Thr Lys Ala Trp Glu Pro Asn Ser Asn Asn Val Trp Thr Thr
            500                 505                 510

Pro Ser Asn Asp Thr Ser Tyr Thr Ile Gln Trp
            515                 520
```

```
<210> SEQ ID NO 3
<211> LENGTH: 20
<212> TYPE: DNA
<213> ORGANISM: Artificial Sequence
<220> FEATURE:
<223> OTHER INFORMATION: Primer

<400> SEQUENCE: 3
agrrtttgat yhtggytcag                                                    20

<210> SEQ ID NO 4
<211> LENGTH: 20
<212> TYPE: DNA
<213> ORGANISM: Artificial Sequence
<220> FEATURE:
<223> OTHER INFORMATION: Primer

<400> SEQUENCE: 4
tgacgggcgg tgtgtacaag                                                    20

<210> SEQ ID NO 5
<211> LENGTH: 20
<212> TYPE: DNA
<213> ORGANISM: Artificial Sequence
<220> FEATURE:
<223> OTHER INFORMATION: Primer
<220> FEATURE:
<221> NAME/KEY: misc_feature
<222> LOCATION: (3)..(3)
<223> OTHER INFORMATION: n is a, c, g, or t
<220> FEATURE:
<221> NAME/KEY: misc_feature
<222> LOCATION: (12)..(12)
<223> OTHER INFORMATION: n is a, c, g, or t
<220> FEATURE:
<221> NAME/KEY: misc_feature
<222> LOCATION: (18)..(18)
<223> OTHER INFORMATION: n is a, c, g, or t

<400> SEQUENCE: 5
gtntggtggg gntaygtnga                                                    20

<210> SEQ ID NO 6
<211> LENGTH: 20
<212> TYPE: DNA
<213> ORGANISM: Artificial Sequence
<220> FEATURE:
<223> OTHER INFORMATION: Primer

<400> SEQUENCE: 6
ggrttrttca tytgccartg                                                    20

<210> SEQ ID NO 7
<211> LENGTH: 21
<212> TYPE: DNA
<213> ORGANISM: Artificial Sequence
<220> FEATURE:
<223> OTHER INFORMATION: Primer

<400> SEQUENCE: 7
ggcagcccag gtaatttcta c                                                  21

<210> SEQ ID NO 8
<211> LENGTH: 20
<212> TYPE: DNA
<213> ORGANISM: Artificial Sequence
<220> FEATURE:
<223> OTHER INFORMATION: Primer
```

<400> SEQUENCE: 8
ggagggttga cttcactcca                                               20

<210> SEQ ID NO 9
<211> LENGTH: 35
<212> TYPE: DNA
<213> ORGANISM: Artificial Sequence
<220> FEATURE:
<223> OTHER INFORMATION: Primer

<400> SEQUENCE: 9
ccgagctcct cgaggcgttt gcttaggttt acgta                              35

<210> SEQ ID NO 10
<211> LENGTH: 35
<212> TYPE: DNA
<213> ORGANISM: Artificial Sequence
<220> FEATURE:
<223> OTHER INFORMATION: Primer

<400> SEQUENCE: 10
ccctgcagga tcctaccact gtattgtata acttg                              35

<210> SEQ ID NO 11
<211> LENGTH: 2536
<212> TYPE: DNA
<213> ORGANISM: Bacillus halosaccharovorans No. 58 Sequence analysis

<400> SEQUENCE: 11
acagaggatt aatatgccag agcaatctcg ctgaagccaa aattgattgt cttagatgaa     60
tctgtgagta gtcttgacat ggtgaatcaa actcttattt tggattatta agtgaattaa    120
aaaaagactt agggttatct tatttcttta tcacacatga tattaaagcg gcgtatacga    180
ttagtgattc attgggtatc ctcgaaaatg gagaactagt tgagatatac gattcaaaag    240 atcactttt tacatcagaa cttttcagaag taaggagat gagggattcc attcttgcgg     300
agcatccacg ttatcgtacg gttagagcaa gataaataat tcaagtaccc aaaaatttat    360
taagttaagg gatatatact tgatttcatt ttctacaatt acacgaacct tgtcagtga    420 ccttaagtaa atctccaaaa gaatctgcta aatttctacg tctcaaaacc ttgttattaa    480
aggactgagg cgttttttat gtcttgaact cgcgataagg agcattatcc ggactactgc    540
gaaaattcca tcccttaggt cctggtaaaa aagtaaatta gaaatggaag cgttttctct    600
tgatgtataa agtgaatctt gccattctag atatgagagt tacataaatt tgtgcaagcg    660
tttgcttagg tttacgtaac tgatttatat ggaaggggga ttttttatgaa acatttgttt    720 atgcgtttag gaattagtat tatgatcgct gtacttatgg tattacctct ttttcagacg    780
gcagtaaatg ctgaaatcaa gacagattat aaagcatctg ttatggcacc attaacaaag    840
attacgaact ggaatgactt tgcaaagcaa cttgctacgc taaaaagtaa tggtgtttat    900
gccttaacga ccgatgtttg gtggggagat gtcgagaaaa atgggataaa tcagtttgat    960
tggtcgtatt atcgtcaata tgcacaaaca gtaagagagt ctggacttaa atgggtaccc   1020
atttatctca cacatcagtg tggtggaaat gtaggagatg attgtaatat ccctgtacca   1080
aattgggtat gggatttaga ttccattgat actcttacac ataagtccga aacaggttat   1140
gtgagtaaag aaacggtttc tccatgggca gcccaggtaa tttctacaca atatgatgaa   1200
ctctatcaat cttttgcaca aaatttctca gactttaaag acatcattat taaaatatat   1260

```
cttagtggtg gaccagcggg tgaacttaga tttccttcct atgtttcaaa tgatagctgg    1320
tcatacccct caagaggaaa gctccaatct tacacagaca ccgcaaaaca tgacttcaga    1380
agcaatatgc aagcaaaata tagcacccct tctaatttaa attctgcatg aacacaaat    1440
ctaacatctt ggagtgaagt caaccctcct tctgatggag accattttt cacttcaggt    1500
gctgcatatt atagtcaata tggtaaggac tttatgacct ggtatcagaa tgtattaatt    1560
aagcatttag agcgtataag tagtaaagcg catgaaaact ttgattcaac cttcggggtt    1620
ccaattggtg caaagattgc aggaattcat tggaaaatga atgatccatc tatgccgcac    1680
gcagctgaat attcagcagg atactatcaa tacacaacaa taatagatca attcaagata    1740
agtaatttac accttacctt tacatgtcta gaaatggatg atagtcaagc ttatacaagc    1800
ccttattatt ccgcacctaa atctcttgta acacaaattg caaatatagc aacttcaagg    1860
ggtatcgtat taaatggtga gaatgcacta gccatctcta gttcagatgc aaattatagc    1920
gaaactcgat atcgaaatac tgcgcagcat ctatttaacg aaggatttag cggcttcaca    1980
ttattaagaa tggaaaacat tgtgaatgct gatgggacga aaacagctga aacggatcgt    2040
tttagagata ttttagttct aacaccaata aaggtagaat tgttgtgaa aaatgctccg     2100
acatattatg gtgattctgt ttatataaca ggtaaccgat gggaaatggg tatgtgggcc    2160
agtcaggatg gcaaaagat taaacttacc tgggatgatg taaataggga ttggagaggt    2220
actggatata ttgcagctag tcgctattat gagtttaaag ctgtaattga agattctaat    2280
ggaaacacaa aagcatggga acctaatagc aacaacgttt ggactacacc tagcaatgac    2340
acaagttata caatacagtg gtagaactta tatatagtaa ggagatcaat atcaatcaaa    2400
agaactcagg tggcaacaga ctatctgagt tctttcttta atcataattt gtaattgaaa    2460
tgcctaataa agtttaacta cgatttggat aggctttttc ttgttaagca atcgggccag    2520
atctggaaca aggaga                                                    2536
```

<210> SEQ ID NO 12
<211> LENGTH: 552
<212> TYPE: PRT
<213> ORGANISM: Bacillus halosaccharovorans

<400> SEQUENCE: 12

```
Met Lys His Leu Phe Met Arg Leu Gly Ile Ser Ile Met Ile Ala Val
1               5                   10                  15

Leu Met Val Leu Pro Leu Phe Gln Thr Ala Val Asn Ala Glu Ile Lys
            20                  25                  30

Thr Asp Tyr Lys Ala Ser Val Met Ala Pro Leu Thr Lys Ile Thr Asn
        35                  40                  45

Trp Asn Asp Phe Ala Lys Gln Leu Ala Thr Leu Lys Ser Asn Gly Val
    50                  55                  60

Tyr Ala Leu Thr Thr Asp Val Trp Trp Gly Asp Val Glu Lys Asn Gly
65                  70                  75                  80

Asp Asn Gln Phe Asp Trp Ser Tyr Tyr Arg Gln Tyr Ala Gln Thr Val
                85                  90                  95

Arg Glu Ser Gly Leu Lys Trp Val Pro Ile Leu Ser Thr His Gln Cys
            100                 105                 110

Gly Gly Asn Val Gly Asp Asp Cys Asn Ile Pro Val Pro Asn Trp Val
        115                 120                 125

Trp Asp Leu Asp Ser Ile Asp Thr Leu Thr His Lys Ser Glu Thr Gly
    130                 135                 140
```

```
Tyr Val Ser Lys Glu Thr Val Ser Pro Trp Ala Ala Gln Val Ile Ser
145                 150                 155                 160

Thr Gln Tyr Asp Glu Leu Tyr Gln Ser Phe Ala Gln Asn Phe Ser Asp
            165                 170                 175

Phe Lys Asp Ile Ile Ile Lys Ile Tyr Leu Ser Gly Gly Pro Ala Gly
        180                 185                 190

Glu Leu Arg Phe Pro Ser Tyr Val Ser Asn Asp Ser Trp Ser Tyr Pro
    195                 200                 205

Ser Arg Gly Lys Leu Gln Ser Tyr Thr Asp Thr Ala Lys His Asp Phe
    210                 215                 220

Arg Ser Asn Met Gln Ala Lys Tyr Ser Thr Leu Ser Asn Leu Asn Ser
225                 230                 235                 240

Ala Trp Asn Thr Asn Leu Thr Ser Trp Ser Glu Val Asn Pro Pro Ser
                245                 250                 255

Asp Gly Asp His Phe Phe Thr Ser Gly Ala Ala Tyr Tyr Ser Gln Tyr
            260                 265                 270

Gly Lys Asp Phe Met Thr Trp Tyr Gln Asn Val Leu Ile Lys His Leu
        275                 280                 285

Glu Arg Ile Ser Ser Lys Ala His Glu Asn Phe Asp Ser Thr Phe Gly
    290                 295                 300

Val Pro Ile Gly Ala Lys Ile Ala Gly Ile His Trp Lys Met Asn Asp
305                 310                 315                 320

Pro Ser Met Pro His Ala Ala Glu Tyr Ser Ala Gly Tyr Tyr Gln Tyr
                325                 330                 335

Thr Thr Ile Ile Asp Gln Phe Lys Ile Ser Asn Leu His Leu Thr Phe
            340                 345                 350

Thr Cys Leu Glu Met Asp Asp Ser Gln Ala Tyr Thr Ser Pro Tyr Tyr
        355                 360                 365

Ser Ala Pro Lys Ser Leu Val Thr Gln Ile Ala Asn Ile Ala Thr Ser
    370                 375                 380

Arg Gly Ile Val Leu Asn Gly Glu Asn Ala Leu Ala Ile Ser Ser Ser
385                 390                 395                 400

Asp Ala Asn Tyr Ser Glu Thr Arg Tyr Arg Asn Thr Ala Gln His Leu
                405                 410                 415

Phe Asn Glu Gly Phe Ser Gly Phe Thr Leu Leu Arg Met Glu Asn Ile
            420                 425                 430

Val Asn Ala Asp Gly Thr Lys Thr Ala Glu Thr Asp Arg Phe Arg Asp
        435                 440                 445

Ile Leu Val Leu Thr Pro Ile Lys Val Glu Phe Val Val Lys Asn Ala
    450                 455                 460

Pro Thr Tyr Tyr Gly Asp Ser Val Tyr Ile Thr Gly Asn Arg Trp Glu
465                 470                 475                 480

Met Gly Met Trp Ala Ser Gln Asp Gly Lys Lys Ile Lys Leu Thr Trp
                485                 490                 495

Asp Asp Val Asn Arg Asp Trp Arg Gly Thr Gly Tyr Ile Ala Ala Ser
            500                 505                 510

Arg Tyr Tyr Glu Phe Lys Ala Val Ile Glu Asp Ser Asn Gly Asn Thr
        515                 520                 525

Lys Ala Trp Glu Pro Asn Ser Asn Asn Val Trp Thr Thr Pro Ser Asn
    530                 535                 540

Asp Thr Ser Tyr Thr Ile Gln Trp
545                 550
```

<210> SEQ ID NO 13
<211> LENGTH: 1572
<212> TYPE: DNA
<213> ORGANISM: Bacillus halosaccharovorans

<400> SEQUENCE: 13

| | | | | | | |
|---|---|---|---|---|---|---|
| gaaatcaaga | cagattataa | agcatctgtt | atggcaccat | taacaaagat | tacgaactgg | 60 |
| aatgactttg | caaagcaact | tgctacgcta | aaaagtaatg | gtgtttatgc | cttaacgacc | 120 |
| gatgtttggt | ggggagatgt | cgagaaaaat | ggggataatc | agtttgattg | gtcgtattat | 180 |
| cgtcaatatg | cacaaacagt | aagagagtct | ggacttaaat | gggtacccat | tttatctaca | 240 |
| catcagtgtg | gtggaaatgt | aggagatgat | tgtaatatcc | ctgtaccaaa | ttgggtatgg | 300 |
| gatttagatt | ccattgatac | tcttacacat | aagtccgaaa | caggttatgt | gagtaaagaa | 360 |
| acggtttctc | catgggcagc | ccaggtaatt | tctacacaat | atgatgaact | ctatcaatct | 420 |
| tttgcacaaa | atttctcaga | ctttaaagac | atcattatta | aaatatatct | tagtggtgga | 480 |
| ccagcgggtg | aacttagatt | tccttcctat | gtttcaaatg | atagctggtc | atacccttca | 540 |
| agaggaaagc | tccaatctta | cacagacacc | gcaaaacatg | acttcagaag | caatatgcaa | 600 |
| gcaaaatata | gcaccctttc | taatttaaat | tctgcatgga | acacaaatct | aacatcttgg | 660 |
| agtgaagtca | accctccttc | tgatggagac | cattttttca | cttcaggtgc | tgcatattat | 720 |
| agtcaatatg | gtaaggactt | tatgacctgg | tatcagaatg | tattaattaa | gcatttagag | 780 |
| cgtataagta | gtaaagcgca | tgaaaacttt | gattcaacct | tcggggttcc | aattggtgca | 840 |
| aagattgcag | gaattcattg | gaaatgaat | gatccatcta | tgccgcacgc | agctgaatat | 900 |
| tcagcaggat | actatcaata | cacaacaata | atagatcaat | tcaagataag | taatttacac | 960 |
| cttacccttta | catgtctaga | aatggatgat | agtcaagctt | atacaagccc | ttattattcc | 1020 |
| gcacctaaat | ctcttgtaac | acaaattgca | aatatagcaa | cttcaagggg | tatcgtatta | 1080 |
| aatggtgaga | atgcactagc | catctctagt | tcagatgcaa | attatagcga | aactcgatat | 1140 |
| cgaaatactg | cgcagcatct | atttaacgaa | ggatttagcg | gcttcacatt | attaagaatg | 1200 |
| gaaaacattg | tgaatgctga | tgggacgaaa | acagctgaaa | cggatcgttt | tagagatatt | 1260 |
| ttagttctaa | caccaataaa | ggtagaattt | gttgtgaaaa | atgctccgac | atattatggt | 1320 |
| gattctgttt | ataatacagg | taaccgatgg | gaaatgggta | tgtgggccag | tcaggatggc | 1380 |
| aaaaagatta | aacttacctg | gatgatgta | aatagggatt | ggagaggtac | tggatatatt | 1440 |
| gcagctagtc | gctattatga | gtttaaagct | gtaattgaag | attctaatgg | aaacacaaaa | 1500 |
| gcatgggaac | ctaatagcaa | caacgttttgg | actacaccta | gcaatgacac | aagttataca | 1560 |
| atacagtggt | ag | | | | | 1572 |

<210> SEQ ID NO 14
<211> LENGTH: 32
<212> TYPE: DNA
<213> ORGANISM: Artificial Sequence
<220> FEATURE:
<223> OTHER INFORMATION: Primer

<400> SEQUENCE: 14
aatgccgaaa tcaagccaga ttataaagca tc             32

<210> SEQ ID NO 15
<211> LENGTH: 33
<212> TYPE: DNA
<213> ORGANISM: Artificial Sequence
<220> FEATURE:

```
<223> OTHER INFORMATION: Primer

<400> SEQUENCE: 15
gttatggcac cattaaaaaa gattacgaac tgg                              33

<210> SEQ ID NO 16
<211> LENGTH: 33
<212> TYPE: DNA
<213> ORGANISM: Artificial Sequence
<220> FEATURE:
<223> OTHER INFORMATION: Primer

<400> SEQUENCE: 16
gttatggcac cattacgcaa gattacgaac tgg                              33

<210> SEQ ID NO 17
<211> LENGTH: 33
<212> TYPE: DNA
<213> ORGANISM: Artificial Sequence
<220> FEATURE:
<223> OTHER INFORMATION: Primer

<400> SEQUENCE: 17
atagatcaat tcaaggasag taatttacac ctt                              33

<210> SEQ ID NO 18
<211> LENGTH: 523
<212> TYPE: PRT
<213> ORGANISM: Bacillus halosaccharovorans

<400> SEQUENCE: 18
```

Glu Ile Lys Pro Asp Tyr Lys Ala Ser Val Met Ala Pro Leu Thr Lys
1               5                   10                  15

Ile Thr Asn Trp Asn Asp Phe Ala Lys Gln Leu Ala Thr Leu Lys Ser
            20                  25                  30

Asn Gly Val Tyr Ala Leu Thr Thr Asp Val Trp Trp Gly Asp Val Glu
        35                  40                  45

Lys Asn Gly Asp Asn Gln Phe Asp Trp Ser Tyr Tyr Arg Gln Tyr Ala
    50                  55                  60

Gln Thr Val Arg Glu Ser Gly Leu Lys Trp Val Pro Ile Leu Ser Thr
65                  70                  75                  80

His Gln Cys Gly Gly Asn Val Gly Asp Asp Cys Asn Ile Pro Val Pro
                85                  90                  95

Asn Trp Val Trp Asp Leu Asp Ser Ile Asp Thr Leu Thr His Lys Ser
            100                 105                 110

Glu Thr Gly Tyr Val Ser Lys Glu Thr Val Ser Pro Trp Ala Ala Gln
        115                 120                 125

Val Ile Ser Thr Gln Tyr Asp Glu Leu Tyr Gln Ser Phe Ala Gln Asn
    130                 135                 140

Phe Ser Asp Phe Lys Asp Ile Ile Ile Lys Ile Tyr Leu Ser Gly Gly
145                 150                 155                 160

Pro Ala Gly Glu Leu Arg Phe Pro Ser Tyr Val Ser Asn Asp Ser Trp
                165                 170                 175

Ser Tyr Pro Ser Arg Gly Lys Leu Gln Ser Tyr Thr Thr Ala Lys
            180                 185                 190

His Asp Phe Arg Ser Asn Met Gln Ala Lys Tyr Ser Thr Leu Ser Asn
        195                 200                 205

Leu Asn Ser Ala Trp Asn Thr Asn Leu Thr Ser Trp Ser Glu Val Asn
    210                 215                 220

```
Pro Pro Ser Asp Gly Asp His Phe Phe Thr Ser Gly Ala Ala Tyr Tyr
225                 230                 235                 240

Ser Gln Tyr Gly Lys Asp Phe Met Thr Trp Tyr Gln Asn Val Leu Ile
            245                 250                 255

Lys His Leu Glu Arg Ile Ser Ser Lys Ala His Glu Asn Phe Asp Ser
        260                 265                 270

Thr Phe Gly Val Pro Ile Gly Ala Lys Ile Ala Gly Ile His Trp Lys
    275                 280                 285

Met Asn Asp Pro Ser Met Pro His Ala Ala Glu Tyr Ser Ala Gly Tyr
290                 295                 300

Tyr Gln Tyr Thr Thr Ile Ile Asp Gln Phe Lys Ile Ser Asn Leu His
305                 310                 315                 320

Leu Thr Phe Thr Cys Leu Glu Met Asp Asp Ser Gln Ala Tyr Thr Ser
                325                 330                 335

Pro Tyr Tyr Ser Ala Pro Lys Ser Leu Val Thr Gln Ile Ala Asn Ile
            340                 345                 350

Ala Thr Ser Arg Gly Ile Val Leu Asn Gly Glu Asn Ala Leu Ala Ile
        355                 360                 365

Ser Ser Ser Asp Ala Asn Tyr Ser Glu Thr Arg Tyr Arg Asn Thr Ala
370                 375                 380

Gln His Leu Phe Asn Glu Gly Phe Ser Gly Phe Thr Leu Leu Arg Met
385                 390                 395                 400

Glu Asn Ile Val Asn Ala Asp Gly Thr Lys Thr Ala Glu Thr Asp Arg
                405                 410                 415

Phe Arg Asp Ile Leu Val Leu Thr Pro Ile Lys Val Glu Phe Val Val
            420                 425                 430

Lys Asn Ala Pro Thr Tyr Tyr Gly Asp Ser Val Tyr Ile Thr Gly Asn
        435                 440                 445

Arg Trp Glu Met Gly Met Trp Ala Ser Gln Asp Gly Lys Lys Ile Lys
    450                 455                 460

Leu Thr Trp Asp Asp Val Asn Arg Asp Trp Arg Gly Thr Gly Tyr Ile
465                 470                 475                 480

Ala Ala Ser Arg Tyr Tyr Glu Phe Lys Ala Val Ile Glu Asp Ser Asn
                485                 490                 495

Gly Asn Thr Lys Ala Trp Glu Pro Asn Ser Asn Asn Val Trp Thr Thr
            500                 505                 510

Pro Ser Asn Asp Thr Ser Tyr Thr Ile Gln Trp
        515                 520

<210> SEQ ID NO 19
<211> LENGTH: 523
<212> TYPE: PRT
<213> ORGANISM: Bacillus halosaccharovorans

<400> SEQUENCE: 19

Glu Ile Lys Thr Asp Tyr Lys Ala Ser Val Met Ala Pro Leu Lys Lys
1               5                   10                  15

Ile Thr Asn Trp Asn Asp Phe Ala Lys Gln Leu Ala Thr Leu Lys Ser
            20                  25                  30

Asn Gly Val Tyr Ala Leu Thr Thr Asp Val Trp Trp Gly Asp Val Glu
        35                  40                  45

Lys Asn Gly Asp Asn Gln Phe Asp Trp Ser Tyr Tyr Arg Gln Tyr Ala
    50                  55                  60
```

-continued

```
Gln Thr Val Arg Glu Ser Gly Leu Lys Trp Val Pro Ile Leu Ser Thr
 65                  70                  75                  80

His Gln Cys Gly Gly Asn Val Gly Asp Asp Cys Asn Ile Pro Val Pro
                 85                  90                  95

Asn Trp Val Trp Asp Leu Asp Ser Ile Asp Thr Leu Thr His Lys Ser
            100                 105                 110

Glu Thr Gly Tyr Val Ser Lys Glu Thr Val Ser Pro Trp Ala Ala Gln
        115                 120                 125

Val Ile Ser Thr Gln Tyr Asp Glu Leu Tyr Gln Ser Phe Ala Gln Asn
    130                 135                 140

Phe Ser Asp Phe Lys Asp Ile Ile Ile Lys Ile Tyr Leu Ser Gly Gly
145                 150                 155                 160

Pro Ala Gly Glu Leu Arg Phe Pro Ser Tyr Val Ser Asn Asp Ser Trp
                165                 170                 175

Ser Tyr Pro Ser Arg Gly Lys Leu Gln Ser Tyr Thr Asp Thr Ala Lys
            180                 185                 190

His Asp Phe Arg Ser Asn Met Gln Ala Lys Tyr Ser Thr Leu Ser Asn
        195                 200                 205

Leu Asn Ser Ala Trp Asn Thr Asn Leu Thr Ser Trp Ser Glu Val Asn
    210                 215                 220

Pro Pro Ser Asp Gly Asp His Phe Phe Thr Ser Gly Ala Ala Tyr Tyr
225                 230                 235                 240

Ser Gln Tyr Gly Lys Asp Phe Met Thr Trp Tyr Gln Asn Val Leu Ile
                245                 250                 255

Lys His Leu Glu Arg Ile Ser Ser Lys Ala His Glu Asn Phe Asp Ser
            260                 265                 270

Thr Phe Gly Val Pro Ile Gly Ala Lys Ile Ala Gly Ile His Trp Lys
        275                 280                 285

Met Asn Asp Pro Ser Met Pro His Ala Ala Glu Tyr Ser Ala Gly Tyr
    290                 295                 300

Tyr Gln Tyr Thr Thr Ile Ile Asp Gln Phe Lys Ile Ser Asn Leu His
305                 310                 315                 320

Leu Thr Phe Thr Cys Leu Glu Met Asp Asp Ser Gln Ala Tyr Thr Ser
                325                 330                 335

Pro Tyr Tyr Ser Ala Pro Lys Ser Leu Val Thr Gln Ile Ala Asn Ile
            340                 345                 350

Ala Thr Ser Arg Gly Ile Val Leu Asn Gly Glu Asn Ala Leu Ala Ile
        355                 360                 365

Ser Ser Ser Asp Ala Asn Tyr Ser Glu Thr Arg Tyr Arg Asn Thr Ala
    370                 375                 380

Gln His Leu Phe Asn Glu Gly Phe Ser Gly Phe Thr Leu Leu Arg Met
385                 390                 395                 400

Glu Asn Ile Val Asn Ala Asp Gly Thr Lys Thr Ala Glu Thr Asp Arg
                405                 410                 415

Phe Arg Asp Ile Leu Val Leu Thr Pro Ile Lys Val Glu Phe Val Val
            420                 425                 430

Lys Asn Ala Pro Thr Tyr Tyr Gly Asp Ser Val Tyr Ile Thr Gly Asn
        435                 440                 445

Arg Trp Glu Met Gly Met Trp Ala Ser Gln Asp Gly Lys Lys Ile Lys
    450                 455                 460

Leu Thr Trp Asp Asp Val Asn Arg Asp Trp Arg Gly Thr Gly Tyr Ile
465                 470                 475                 480
```

```
Ala Ala Ser Arg Tyr Tyr Glu Phe Lys Ala Val Ile Glu Asp Ser Asn
                485                 490                 495

Gly Asn Thr Lys Ala Trp Glu Pro Asn Ser Asn Asn Val Trp Thr Thr
            500                 505                 510

Pro Ser Asn Asp Thr Ser Tyr Thr Ile Gln Trp
        515                 520

<210> SEQ ID NO 20
<211> LENGTH: 523
<212> TYPE: PRT
<213> ORGANISM: Bacillus halosaccharovorans

<400> SEQUENCE: 20

Glu Ile Lys Thr Asp Tyr Lys Ala Ser Val Met Ala Pro Leu Arg Lys
1               5                   10                  15

Ile Thr Asn Trp Asn Asp Phe Ala Lys Gln Leu Ala Thr Leu Lys Ser
            20                  25                  30

Asn Gly Val Tyr Ala Leu Thr Thr Asp Val Trp Trp Gly Asp Val Glu
        35                  40                  45

Lys Asn Gly Asp Asn Gln Phe Asp Trp Ser Tyr Tyr Arg Gln Tyr Ala
50                  55                  60

Gln Thr Val Arg Glu Ser Gly Leu Lys Trp Val Pro Ile Leu Ser Thr
65                  70                  75                  80

His Gln Cys Gly Gly Asn Val Gly Asp Asp Cys Asn Ile Pro Val Pro
                85                  90                  95

Asn Trp Val Trp Asp Leu Asp Ser Ile Asp Thr Leu Thr His Lys Ser
            100                 105                 110

Glu Thr Gly Tyr Val Ser Lys Glu Thr Val Ser Pro Trp Ala Ala Gln
        115                 120                 125

Val Ile Ser Thr Gln Tyr Asp Glu Leu Tyr Gln Ser Phe Ala Gln Asn
    130                 135                 140

Phe Ser Asp Phe Lys Asp Ile Ile Ile Lys Ile Tyr Leu Ser Gly Gly
145                 150                 155                 160

Pro Ala Gly Glu Leu Arg Phe Pro Ser Tyr Val Ser Asn Asp Ser Trp
                165                 170                 175

Ser Tyr Pro Ser Arg Gly Lys Leu Gln Ser Tyr Thr Asp Thr Ala Lys
            180                 185                 190

His Asp Phe Arg Ser Asn Met Gln Ala Lys Tyr Ser Thr Leu Ser Asn
        195                 200                 205

Leu Asn Ser Ala Trp Asn Thr Asn Leu Thr Ser Trp Ser Glu Val Asn
    210                 215                 220

Pro Pro Ser Asp Gly Asp His Phe Phe Thr Ser Gly Ala Ala Tyr Tyr
225                 230                 235                 240

Ser Gln Tyr Gly Lys Asp Phe Met Thr Trp Tyr Gln Asn Val Leu Ile
                245                 250                 255

Lys His Leu Glu Arg Ile Ser Ser Lys Ala His Glu Asn Phe Asp Ser
            260                 265                 270

Thr Phe Gly Val Pro Ile Gly Ala Lys Ile Ala Gly Ile His Trp Lys
        275                 280                 285

Met Asn Asp Pro Ser Met Pro His Ala Ala Glu Tyr Ser Ala Gly Tyr
    290                 295                 300

Tyr Gln Tyr Thr Thr Ile Ile Asp Gln Phe Lys Ile Ser Asn Leu His
305                 310                 315                 320

Leu Thr Phe Thr Cys Leu Glu Met Asp Asp Ser Gln Ala Tyr Thr Ser
                325                 330                 335
```

```
Pro Tyr Tyr Ser Ala Pro Lys Ser Leu Val Thr Gln Ile Ala Asn Ile
            340                 345                 350

Ala Thr Ser Arg Gly Ile Val Leu Asn Gly Glu Asn Ala Leu Ala Ile
            355                 360                 365

Ser Ser Ser Asp Ala Asn Tyr Ser Glu Thr Arg Tyr Arg Asn Thr Ala
            370                 375                 380

Gln His Leu Phe Asn Glu Gly Phe Ser Gly Phe Thr Leu Leu Arg Met
385                 390                 395                 400

Glu Asn Ile Val Asn Ala Asp Gly Thr Lys Thr Ala Glu Thr Asp Arg
                405                 410                 415

Phe Arg Asp Ile Leu Val Leu Thr Pro Ile Lys Val Glu Phe Val Val
            420                 425                 430

Lys Asn Ala Pro Thr Tyr Tyr Gly Asp Ser Val Tyr Ile Thr Gly Asn
            435                 440                 445

Arg Trp Glu Met Gly Met Trp Ala Ser Gln Asp Gly Lys Lys Ile Lys
            450                 455                 460

Leu Thr Trp Asp Asp Val Asn Arg Asp Trp Arg Gly Thr Gly Tyr Ile
465                 470                 475                 480

Ala Ala Ser Arg Tyr Tyr Glu Phe Lys Ala Val Ile Glu Asp Ser Asn
                485                 490                 495

Gly Asn Thr Lys Ala Trp Glu Pro Asn Ser Asn Asn Val Trp Thr Thr
            500                 505                 510

Pro Ser Asn Asp Thr Ser Tyr Thr Ile Gln Trp
            515                 520

<210> SEQ ID NO 21
<211> LENGTH: 523
<212> TYPE: PRT
<213> ORGANISM: Bacillus halosaccharovorans

<400> SEQUENCE: 21

Glu Ile Lys Thr Asp Tyr Lys Ala Ser Val Met Ala Pro Leu Thr Lys
1               5                   10                  15

Ile Thr Asn Trp Asn Asp Phe Ala Lys Gln Leu Ala Thr Leu Lys Ser
            20                  25                  30

Asn Gly Val Tyr Ala Leu Thr Thr Asp Val Trp Trp Gly Asp Val Glu
            35                  40                  45

Lys Asn Gly Asp Asn Gln Phe Asp Trp Ser Tyr Tyr Arg Gln Tyr Ala
            50                  55                  60

Gln Thr Val Arg Glu Ser Gly Leu Lys Trp Val Pro Ile Leu Ser Thr
65                  70                  75                  80

His Gln Cys Gly Gly Asn Val Gly Asp Asp Cys Asn Ile Pro Val Pro
                85                  90                  95

Asn Trp Val Trp Asp Leu Asp Ser Ile Asp Thr Leu Thr His Lys Ser
            100                 105                 110

Glu Thr Gly Tyr Val Ser Lys Glu Thr Val Ser Pro Trp Ala Ala Gln
            115                 120                 125

Val Ile Ser Thr Gln Tyr Asp Glu Leu Tyr Gln Ser Phe Ala Gln Asn
            130                 135                 140

Phe Ser Asp Phe Lys Asp Ile Ile Lys Ile Tyr Leu Ser Gly Gly
145                 150                 155                 160

Pro Ala Gly Glu Leu Arg Phe Pro Ser Tyr Val Ser Asn Asp Ser Trp
            165                 170                 175
```

Ser Tyr Pro Ser Arg Gly Lys Leu Gln Ser Tyr Thr Asp Thr Ala Lys
            180                 185                 190

His Asp Phe Arg Ser Asn Met Gln Ala Lys Tyr Ser Thr Leu Ser Asn
            195                 200                 205

Leu Asn Ser Ala Trp Asn Thr Asn Leu Thr Ser Trp Ser Glu Val Asn
210                 215                 220

Pro Pro Ser Asp Gly Asp His Phe Phe Thr Ser Gly Ala Ala Tyr Tyr
225                 230                 235                 240

Ser Gln Tyr Gly Lys Asp Phe Met Thr Trp Tyr Gln Asn Val Leu Ile
            245                 250                 255

Lys His Leu Glu Arg Ile Ser Ser Lys Ala His Glu Asn Phe Asp Ser
            260                 265                 270

Thr Phe Gly Val Pro Ile Gly Ala Lys Ile Ala Gly Ile His Trp Lys
            275                 280                 285

Met Asn Asp Pro Ser Met Pro His Ala Ala Glu Tyr Ser Ala Gly Tyr
290                 295                 300

Tyr Asp Tyr Thr Thr Ile Ile Asp Gln Phe Lys Ile Ser Asn Leu His
305                 310                 315                 320

Leu Thr Phe Thr Cys Leu Glu Met Asp Asp Ser Gln Ala Tyr Thr Ser
            325                 330                 335

Pro Tyr Tyr Ser Ala Pro Lys Ser Leu Val Thr Gln Ile Ala Asn Ile
            340                 345                 350

Ala Thr Ser Arg Gly Ile Val Leu Asn Gly Glu Asn Ala Leu Ala Ile
            355                 360                 365

Ser Ser Ser Asp Ala Asn Tyr Ser Glu Thr Arg Tyr Arg Asn Thr Ala
370                 375                 380

Gln His Leu Phe Asn Glu Gly Phe Ser Gly Phe Thr Leu Leu Arg Met
385                 390                 395                 400

Glu Asn Ile Val Asn Ala Asp Gly Thr Lys Thr Ala Glu Thr Asp Arg
            405                 410                 415

Phe Arg Asp Ile Leu Val Leu Thr Pro Ile Lys Val Glu Phe Val Val
            420                 425                 430

Lys Asn Ala Pro Thr Tyr Tyr Gly Asp Ser Val Tyr Ile Thr Gly Asn
            435                 440                 445

Arg Trp Glu Met Gly Met Trp Ala Ser Gln Asp Gly Lys Lys Ile Lys
450                 455                 460

Leu Thr Trp Asp Asp Val Asn Arg Asp Trp Arg Gly Thr Gly Tyr Ile
465                 470                 475                 480

Ala Ala Ser Arg Tyr Tyr Glu Phe Lys Ala Val Ile Glu Asp Ser Asn
            485                 490                 495

Gly Asn Thr Lys Ala Trp Glu Pro Asn Ser Asn Asn Val Trp Thr Thr
            500                 505                 510

Pro Ser Asn Asp Thr Ser Tyr Thr Ile Gln Trp
            515                 520

<210> SEQ ID NO 22
<211> LENGTH: 552
<212> TYPE: PRT
<213> ORGANISM: Bacillus halosaccharovorans

<400> SEQUENCE: 22

Met Lys His Leu Phe Met Arg Leu Gly Ile Ser Ile Met Ile Ala Val
1               5                   10                  15

```
Leu Met Val Leu Pro Leu Phe Gln Thr Ala Val Asn Ala Glu Ile Lys
         20                  25                  30

Pro Asp Tyr Lys Ala Ser Val Met Ala Pro Leu Thr Lys Ile Thr Asn
         35                  40                  45

Trp Asn Asp Phe Ala Lys Gln Leu Ala Thr Leu Lys Ser Asn Gly Val
 50                  55                  60

Tyr Ala Leu Thr Thr Asp Val Trp Trp Gly Val Glu Lys Asn Gly
 65                  70                  75                  80

Asp Asn Gln Phe Asp Trp Ser Tyr Tyr Arg Gln Tyr Ala Gln Thr Val
                 85                  90                  95

Arg Glu Ser Gly Leu Lys Trp Val Pro Ile Leu Ser Thr His Gln Cys
             100                 105                 110

Gly Gly Asn Val Gly Asp Asp Cys Asn Ile Pro Val Pro Asn Trp Val
             115                 120                 125

Trp Asp Leu Asp Ser Ile Asp Thr Leu Thr His Lys Ser Glu Thr Gly
 130                 135                 140

Tyr Val Ser Lys Glu Thr Val Ser Pro Trp Ala Ala Gln Val Ile Ser
145                 150                 155                 160

Thr Gln Tyr Asp Glu Leu Tyr Gln Ser Phe Ala Gln Asn Phe Ser Asp
                 165                 170                 175

Phe Lys Asp Ile Ile Ile Lys Ile Tyr Leu Ser Gly Pro Ala Gly
             180                 185                 190

Glu Leu Arg Phe Pro Ser Tyr Val Ser Asn Asp Ser Trp Ser Tyr Pro
             195                 200                 205

Ser Arg Gly Lys Leu Gln Ser Tyr Thr Asp Thr Ala Lys His Asp Phe
210                 215                 220

Arg Ser Asn Met Gln Ala Lys Tyr Ser Thr Leu Ser Asn Leu Asn Ser
225                 230                 235                 240

Ala Trp Asn Thr Asn Leu Thr Ser Trp Ser Glu Val Asn Pro Pro Ser
             245                 250                 255

Asp Gly Asp His Phe Phe Thr Ser Gly Ala Ala Tyr Tyr Ser Gln Tyr
             260                 265                 270

Gly Lys Asp Phe Met Thr Trp Tyr Gln Asn Val Leu Ile Lys His Leu
             275                 280                 285

Glu Arg Ile Ser Ser Lys Ala His Glu Asn Phe Asp Ser Thr Phe Gly
             290                 295                 300

Val Pro Ile Gly Ala Lys Ile Ala Gly Ile His Trp Lys Met Asn Asp
305                 310                 315                 320

Pro Ser Met Pro His Ala Ala Glu Tyr Ser Ala Gly Tyr Tyr Gln Tyr
                 325                 330                 335

Thr Thr Ile Ile Asp Gln Phe Lys Ile Ser Asn Leu His Leu Thr Phe
             340                 345                 350

Thr Cys Leu Glu Met Asp Asp Ser Gln Ala Tyr Thr Ser Pro Tyr Tyr
             355                 360                 365

Ser Ala Pro Lys Ser Leu Val Thr Gln Ile Ala Asn Ile Ala Thr Ser
         370                 375                 380

Arg Gly Ile Val Leu Asn Gly Glu Asn Ala Leu Ala Ile Ser Ser Ser
385                 390                 395                 400

Asp Ala Asn Tyr Ser Glu Thr Arg Tyr Arg Asn Thr Ala Gln His Leu
             405                 410                 415

Phe Asn Glu Gly Phe Ser Gly Phe Thr Leu Leu Arg Met Glu Asn Ile
             420                 425                 430
```

```
Val Asn Ala Asp Gly Thr Lys Thr Ala Glu Thr Asp Arg Phe Arg Asp
            435                 440                 445

Ile Leu Val Leu Thr Pro Ile Lys Val Glu Phe Val Val Lys Asn Ala
        450                 455                 460

Pro Thr Tyr Tyr Gly Asp Ser Val Tyr Ile Thr Gly Asn Arg Trp Glu
465                 470                 475                 480

Met Gly Met Trp Ala Ser Gln Asp Gly Lys Lys Ile Lys Leu Thr Trp
                485                 490                 495

Asp Asp Val Asn Arg Asp Trp Arg Gly Thr Gly Tyr Ile Ala Ala Ser
                500                 505                 510

Arg Tyr Tyr Glu Phe Lys Ala Val Ile Glu Asp Ser Asn Gly Asn Thr
        515                 520                 525

Lys Ala Trp Glu Pro Asn Ser Asn Asn Val Trp Thr Thr Pro Ser Asn
    530                 535                 540

Asp Thr Ser Tyr Thr Ile Gln Trp
545                 550

<210> SEQ ID NO 23
<211> LENGTH: 552
<212> TYPE: PRT
<213> ORGANISM: Bacillus halosaccharovorans

<400> SEQUENCE: 23

Met Lys His Leu Phe Met Arg Leu Gly Ile Ser Ile Met Ile Ala Val
1               5                   10                  15

Leu Met Val Leu Pro Leu Phe Gln Thr Ala Val Asn Ala Glu Ile Lys
            20                  25                  30

Thr Asp Tyr Lys Ala Ser Val Met Ala Pro Leu Lys Lys Ile Thr Asn
        35                  40                  45

Trp Asn Asp Phe Ala Lys Gln Leu Ala Thr Leu Lys Ser Asn Gly Val
    50                  55                  60

Tyr Ala Leu Thr Thr Asp Val Trp Trp Gly Asp Val Glu Lys Asn Gly
65                  70                  75                  80

Asp Asn Gln Phe Asp Trp Ser Tyr Tyr Arg Gln Tyr Ala Gln Thr Val
                85                  90                  95

Arg Glu Ser Gly Leu Lys Trp Val Pro Ile Leu Ser Thr His Gln Cys
            100                 105                 110

Gly Gly Asn Val Gly Asp Asp Cys Asn Ile Pro Val Pro Asn Trp Val
        115                 120                 125

Trp Asp Leu Asp Ser Ile Asp Thr Leu Thr His Lys Ser Glu Thr Gly
    130                 135                 140

Tyr Val Ser Lys Glu Thr Val Ser Pro Trp Ala Ala Gln Val Ile Ser
145                 150                 155                 160

Thr Gln Tyr Asp Glu Leu Tyr Gln Ser Phe Ala Gln Asn Phe Ser Asp
                165                 170                 175

Phe Lys Asp Ile Ile Lys Ile Tyr Leu Ser Gly Gly Pro Ala Gly
            180                 185                 190

Glu Leu Arg Phe Pro Ser Tyr Val Ser Asn Asp Ser Trp Ser Tyr Pro
        195                 200                 205

Ser Arg Gly Lys Leu Gln Ser Tyr Thr Asp Thr Ala Lys His Asp Phe
    210                 215                 220

Arg Ser Asn Met Gln Ala Lys Tyr Ser Thr Leu Ser Asn Leu Asn Ser
225                 230                 235                 240

Ala Trp Asn Thr Asn Leu Thr Ser Trp Ser Glu Val Asn Pro Pro Ser
                245                 250                 255
```

Asp Gly Asp His Phe Phe Thr Ser Gly Ala Ala Tyr Ser Gln Tyr
            260                 265                 270

Gly Lys Asp Phe Met Thr Trp Tyr Gln Asn Val Leu Ile Lys His Leu
        275                 280                 285

Glu Arg Ile Ser Ser Lys Ala His Glu Asn Phe Asp Ser Thr Phe Gly
    290                 295                 300

Val Pro Ile Gly Ala Lys Ile Ala Gly Ile His Trp Lys Met Asn Asp
305                 310                 315                 320

Pro Ser Met Pro His Ala Ala Glu Tyr Ser Ala Gly Tyr Tyr Gln Tyr
                325                 330                 335

Thr Thr Ile Ile Asp Gln Phe Lys Ile Ser Asn Leu His Leu Thr Phe
            340                 345                 350

Thr Cys Leu Glu Met Asp Asp Ser Gln Ala Tyr Thr Ser Pro Tyr Tyr
        355                 360                 365

Ser Ala Pro Lys Ser Leu Val Thr Gln Ile Ala Asn Ile Ala Thr Ser
    370                 375                 380

Arg Gly Ile Val Leu Asn Gly Glu Asn Ala Leu Ala Ile Ser Ser Ser
385                 390                 395                 400

Asp Ala Asn Tyr Ser Glu Thr Arg Tyr Arg Asn Thr Ala Gln His Leu
                405                 410                 415

Phe Asn Glu Gly Phe Ser Gly Phe Thr Leu Leu Arg Met Glu Asn Ile
            420                 425                 430

Val Asn Ala Asp Gly Thr Lys Thr Ala Glu Thr Asp Arg Phe Arg Asp
        435                 440                 445

Ile Leu Val Leu Thr Pro Ile Lys Val Glu Phe Val Val Lys Asn Ala
    450                 455                 460

Pro Thr Tyr Tyr Gly Asp Ser Val Tyr Ile Thr Gly Asn Arg Trp Glu
465                 470                 475                 480

Met Gly Met Trp Ala Ser Gln Asp Gly Lys Lys Ile Lys Leu Thr Trp
                485                 490                 495

Asp Asp Val Asn Arg Asp Trp Arg Gly Thr Gly Tyr Ile Ala Ala Ser
            500                 505                 510

Arg Tyr Tyr Glu Phe Lys Ala Val Ile Glu Asp Ser Asn Gly Asn Thr
        515                 520                 525

Lys Ala Trp Glu Pro Asn Ser Asn Asn Val Trp Thr Thr Pro Ser Asn
    530                 535                 540

Asp Thr Ser Tyr Thr Ile Gln Trp
545                 550

<210> SEQ ID NO 24
<211> LENGTH: 552
<212> TYPE: PRT
<213> ORGANISM: Bacillus halosaccharovorans

<400> SEQUENCE: 24

Met Lys His Leu Phe Met Arg Leu Gly Ile Ser Ile Met Ile Ala Val
1               5                   10                  15

Leu Met Val Leu Pro Leu Phe Gln Thr Ala Val Asn Ala Glu Ile Lys
            20                  25                  30

Thr Asp Tyr Lys Ala Ser Val Met Ala Pro Leu Arg Lys Ile Thr Asn
        35                  40                  45

Trp Asn Asp Phe Ala Lys Gln Leu Ala Thr Leu Lys Ser Asn Gly Val
    50                  55                  60

```
Tyr Ala Leu Thr Thr Asp Val Trp Gly Asp Val Glu Lys Asn Gly
 65                  70                  75                  80

Asp Asn Gln Phe Asp Trp Ser Tyr Tyr Arg Gln Tyr Ala Gln Thr Val
                 85                  90                  95

Arg Glu Ser Gly Leu Lys Trp Val Pro Ile Leu Ser Thr His Gln Cys
            100                 105                 110

Gly Gly Asn Val Gly Asp Asp Cys Asn Ile Pro Val Pro Asn Trp Val
        115                 120                 125

Trp Asp Leu Asp Ser Ile Asp Thr Leu Thr His Lys Ser Glu Thr Gly
130                 135                 140

Tyr Val Ser Lys Glu Thr Val Ser Pro Trp Ala Ala Gln Val Ile Ser
145                 150                 155                 160

Thr Gln Tyr Asp Glu Leu Tyr Gln Ser Phe Ala Gln Asn Phe Ser Asp
                165                 170                 175

Phe Lys Asp Ile Ile Ile Lys Ile Tyr Leu Ser Gly Gly Pro Ala Gly
            180                 185                 190

Glu Leu Arg Phe Pro Ser Tyr Val Ser Asn Asp Ser Trp Ser Tyr Pro
        195                 200                 205

Ser Arg Gly Lys Leu Gln Ser Tyr Thr Asp Thr Ala Lys His Asp Phe
210                 215                 220

Arg Ser Asn Met Gln Ala Lys Tyr Ser Thr Leu Ser Asn Leu Asn Ser
225                 230                 235                 240

Ala Trp Asn Thr Asn Leu Thr Ser Trp Ser Glu Val Asn Pro Pro Ser
                245                 250                 255

Asp Gly Asp His Phe Phe Thr Ser Gly Ala Ala Tyr Tyr Ser Gln Tyr
            260                 265                 270

Gly Lys Asp Phe Met Thr Trp Tyr Gln Asn Val Leu Ile Lys His Leu
        275                 280                 285

Glu Arg Ile Ser Ser Lys Ala His Glu Asn Phe Asp Ser Thr Phe Gly
290                 295                 300

Val Pro Ile Gly Ala Lys Ile Ala Gly Ile His Trp Lys Met Asn Asp
305                 310                 315                 320

Pro Ser Met Pro His Ala Ala Glu Tyr Ser Ala Gly Tyr Tyr Gln Tyr
                325                 330                 335

Thr Thr Ile Ile Asp Gln Phe Lys Ile Ser Asn Leu His Leu Thr Phe
            340                 345                 350

Thr Cys Leu Glu Met Asp Asp Ser Gln Ala Tyr Thr Ser Pro Tyr Tyr
        355                 360                 365

Ser Ala Pro Lys Ser Leu Val Thr Gln Ile Ala Asn Ile Ala Thr Ser
370                 375                 380

Arg Gly Ile Val Leu Asn Gly Glu Asn Ala Leu Ala Ile Ser Ser Ser
385                 390                 395                 400

Asp Ala Asn Tyr Ser Glu Thr Arg Tyr Arg Asn Thr Ala Gln His Leu
                405                 410                 415

Phe Asn Glu Gly Phe Ser Gly Phe Thr Leu Leu Arg Met Glu Asn Ile
            420                 425                 430

Val Asn Ala Asp Gly Thr Lys Thr Ala Glu Thr Asp Arg Phe Arg Asp
        435                 440                 445

Ile Leu Val Leu Thr Pro Ile Lys Val Glu Phe Val Val Lys Asn Ala
450                 455                 460

Pro Thr Tyr Tyr Gly Asp Ser Val Tyr Ile Thr Gly Asn Arg Trp Glu
465                 470                 475                 480
```

```
Met Gly Met Trp Ala Ser Gln Asp Gly Lys Ile Lys Leu Thr Trp
            485                 490                 495

Asp Asp Val Asn Arg Asp Trp Arg Gly Thr Gly Tyr Ile Ala Ala Ser
            500                 505                 510

Arg Tyr Tyr Glu Phe Lys Ala Val Ile Glu Asp Ser Asn Gly Asn Thr
            515                 520                 525

Lys Ala Trp Glu Pro Asn Ser Asn Asn Val Trp Thr Thr Pro Ser Asn
            530                 535                 540

Asp Thr Ser Tyr Thr Ile Gln Trp
545                 550

<210> SEQ ID NO 25
<211> LENGTH: 552
<212> TYPE: PRT
<213> ORGANISM: Bacillus halosaccharovorans

<400> SEQUENCE: 25

Met Lys His Leu Phe Met Arg Leu Gly Ile Ser Ile Met Ile Ala Val
1               5                   10                  15

Leu Met Val Leu Pro Leu Phe Gln Thr Ala Val Asn Ala Glu Ile Lys
            20                  25                  30

Thr Asp Tyr Lys Ala Ser Val Met Ala Pro Leu Thr Lys Ile Thr Asn
            35                  40                  45

Trp Asn Asp Phe Ala Lys Gln Leu Ala Thr Leu Lys Ser Asn Gly Val
    50                  55                  60

Tyr Ala Leu Thr Thr Asp Val Trp Trp Gly Asp Val Glu Lys Asn Gly
65                  70                  75                  80

Asp Asn Gln Phe Asp Trp Ser Tyr Tyr Arg Gln Tyr Ala Gln Thr Val
                85                  90                  95

Arg Glu Ser Gly Leu Lys Trp Val Pro Ile Leu Ser Thr His Gln Cys
            100                 105                 110

Gly Gly Asn Val Gly Asp Asp Cys Asn Ile Pro Val Pro Asn Trp Val
            115                 120                 125

Trp Asp Leu Asp Ser Ile Asp Thr Leu Thr His Lys Ser Glu Thr Gly
    130                 135                 140

Tyr Val Ser Lys Glu Thr Val Ser Pro Trp Ala Ala Gln Val Ile Ser
145                 150                 155                 160

Thr Gln Tyr Asp Glu Leu Tyr Gln Ser Phe Ala Gln Asn Phe Ser Asp
                165                 170                 175

Phe Lys Asp Ile Ile Ile Lys Ile Tyr Leu Ser Gly Gly Pro Ala Gly
            180                 185                 190

Glu Leu Arg Phe Pro Ser Tyr Val Ser Asn Asp Ser Trp Ser Tyr Pro
            195                 200                 205

Ser Arg Gly Lys Leu Gln Ser Tyr Thr Asp Thr Ala Lys His Asp Phe
    210                 215                 220

Arg Ser Asn Met Gln Ala Lys Tyr Ser Thr Leu Ser Asn Leu Asn Ser
225                 230                 235                 240

Ala Trp Asn Thr Asn Leu Thr Ser Trp Ser Glu Val Asn Pro Pro Ser
                245                 250                 255

Asp Gly Asp His Phe Phe Thr Ser Gly Ala Ala Tyr Tyr Ser Gln Tyr
            260                 265                 270

Gly Lys Asp Phe Met Thr Trp Tyr Gln Asn Val Leu Ile Lys His Leu
            275                 280                 285

Glu Arg Ile Ser Ser Lys Ala His Glu Asn Phe Asp Ser Thr Phe Gly
    290                 295                 300
```

Val Pro Ile Gly Ala Lys Ile Ala Gly Ile His Trp Lys Met Asn Asp
305                 310                 315                 320

Pro Ser Met Pro His Ala Ala Glu Tyr Ser Ala Gly Tyr Tyr Asp Tyr
            325                 330                 335

Thr Thr Ile Ile Asp Gln Phe Lys Ile Ser Asn Leu His Leu Thr Phe
            340                 345                 350

Thr Cys Leu Glu Met Asp Asp Ser Gln Ala Tyr Thr Ser Pro Tyr Tyr
            355                 360                 365

Ser Ala Pro Lys Ser Leu Val Thr Gln Ile Ala Asn Ile Ala Thr Ser
370                 375                 380

Arg Gly Ile Val Leu Asn Gly Glu Asn Ala Leu Ala Ile Ser Ser Ser
385                 390                 395                 400

Asp Ala Asn Tyr Ser Glu Thr Arg Tyr Arg Asn Thr Ala Gln His Leu
            405                 410                 415

Phe Asn Glu Gly Phe Ser Gly Phe Thr Leu Leu Arg Met Glu Asn Ile
            420                 425                 430

Val Asn Ala Asp Gly Thr Lys Thr Ala Glu Thr Asp Arg Phe Arg Asp
            435                 440                 445

Ile Leu Val Leu Thr Pro Ile Lys Val Glu Phe Val Val Lys Asn Ala
450                 455                 460

Pro Thr Tyr Tyr Gly Asp Ser Val Tyr Ile Thr Gly Asn Arg Trp Glu
465                 470                 475                 480

Met Gly Met Trp Ala Ser Gln Asp Gly Lys Lys Ile Lys Leu Thr Trp
            485                 490                 495

Asp Asp Val Asn Arg Asp Trp Arg Gly Thr Gly Tyr Ile Ala Ala Ser
            500                 505                 510

Arg Tyr Tyr Glu Phe Lys Ala Val Ile Glu Asp Ser Asn Gly Asn Thr
            515                 520                 525

Lys Ala Trp Glu Pro Asn Ser Asn Asn Val Trp Thr Thr Pro Ser Asn
530                 535                 540

Asp Thr Ser Tyr Thr Ile Gln Trp
545                 550

<210> SEQ ID NO 26
<211> LENGTH: 1659
<212> TYPE: DNA
<213> ORGANISM: Bacillus halosaccharovorans

<400> SEQUENCE: 26
atgaaacatt tgtttatgcg tttaggaatt agtattatga tcgctgtact tatggtatta      60 cctcttttc agacggcagt aaatgctgaa atcaagccag attataaagc atctgttatg      120
gcaccattaa caaagattac gaactggaat gactttgcaa agcaacttgc tacgctaaaa     180
agtaatggtg tttatgcctt aacgaccgat gtttggtggg agatgtcga gaaaaatggg      240 gataatcagt tgattggtc gtattatcgt caatatgcac aaacagtaag agagtctgga      300
cttaaatggg tacccatttt atctacacat cagtgtggtg gaaatgtagg gatgattgt      360 aatatccctg taccaaattg ggtatgggat ttagattcca ttgatactct tacacataag    420
tccgaaacag gttatgtgag taagaaacg gtttctccat gggcagccca ggtaatttct     480
acacaatatg atgaactcta tcaatctttt gcacaaaatt tctcagactt aaagacatc     540 attattaaaa tatatcttag tggtggacca gcgggtgaac ttagatttcc ttcctatgtt    600
tcaaatgata gctggtcata cccttcaaga ggaaagctcc aatcttacac agacaccgca   660

```
aaacatgact tcagaagcaa tatgcaagca aaatatagca ccctttctaa tttaaattct        720
gcatggaaca caaatctaac atcttggagt gaagtcaacc ctccttctga tggagaccat        780
tttttcactt caggtgctgc atattatagt caatatggta aggactttat gacctggtat        840
cagaatgtat taattaagca tttagagcgt ataagtagta aagcgcatga aactttgat         900 tcaaccttcg gggttccaat tggtgcaaag attgcaggaa ttcattggaa atgaatgat         960 ccatctatgc cgcacgcagc tgaatattca gcaggatact atcaatacac aacaataata       1020
gatcaattca agataagtaa tttacacctt acctttacat gtctagaaat ggatgatagt       1080
caagcttata caagccctta ttattccgca cctaaatctc ttgtaacaca aattgcaaat       1140
atagcaactt caaggggtat cgtattaaat ggtgagaatg cactagccat ctctagttca       1200
gatgcaaatt atagcgaaac tcgatatcga aatactgcgc agcatctatt taacgaagga       1260
tttagcggct tcacattatt aagaatggaa acattgtga atgctgatgg gacgaaaaca        1320
gctgaaacgg atcgttttag atatttta gttctaacac caataaaggt agaatttgtt         1380
gtgaaaaatg ctccgacata ttatggtgat tctgtttata taacaggtaa ccgatgggaa       1440
atgggtatgt gggccagtca ggatggcaaa aagattaaac ttacctggga tgatgtaaat       1500
agggattgga gaggtactgg atatattgca gctagtcgct attatgagtt taaagctgta       1560
attgaagatt ctaatggaaa cacaaaagca tgggaaccta atagcaacaa cgtttggact       1620
acacctagca atgacacaag ttatacaata cagtggtag                              1659

<210> SEQ ID NO 27
<211> LENGTH: 1659
<212> TYPE: DNA
<213> ORGANISM: Bacillus halosaccharovorans

<400> SEQUENCE: 27
atgaaacatt tgtttatgcg tttaggaatt agtattatga tcgctgtact tatggtatta        60 cctcttttc agacggcagt aaatgctgaa atcaagacag attataaagc atctgttatg        120
gcaccattaa aaaagattac gaactggaat gactttgcaa agcaacttgc tacgctaaaa       180
agtaatggtg tttatgcctt aacgaccgat gtttggtggg agatgtcga gaaaaatggg        240 gataatcagt ttgattggtc gtattatcgt caatatgcac aaacagtaag agagtctgga       300
cttaaatggg tacccatttt atctacacat cagtgtggtg gaaatgtagg agatgattgt       360
aatatccctg taccaaattg ggtatgggat ttagattcca ttgatactct tacacataag       420
tccgaaacag gttatgtgag taagaaacg gtttctccat gggcagccca ggtaatttct        480
acacaatatg atgaactcta tcaatctttt gcacaaaatt tctcagactt taaagacatc       540
attattaaaa tatatcttag tggtggacca gcgggtgaac ttagatttcc ttcctatgtt       600
tcaaatgata gctggtcata cccttcaaga ggaaagctcc aatcttacac agacaccgca       660
aaacatgact tcagaagcaa tatgcaagca aaatatagca ccctttctaa tttaaattct       720
gcatggaaca caaatctaac atcttggagt gaagtcaacc ctccttctga tggagaccat       780
tttttcactt caggtgctgc atattatagt caatatggta aggactttat gacctggtat       840
cagaatgtat taattaagca tttagagcgt ataagtagta aagcgcatga aactttgat        900 tcaaccttcg gggttccaat tggtgcaaag attgcaggaa ttcattggaa atgaatgat        960 ccatctatgc cgcacgcagc tgaatattca gcaggatact atcaatacac aacaataata      1020
gatcaattca agataagtaa tttacacctt acctttacat gtctagaaat ggatgatagt      1080
caagcttata caagccctta ttattccgca cctaaatctc ttgtaacaca aattgcaaat      1140
```

```
atagcaactt caaggggtat cgtattaaat ggtgagaatg cactagccat ctctagttca    1200
gatgcaaatt atagcgaaac tcgatatcga aatactgcgc agcatctatt taacgaagga    1260
tttagcggct tcacattatt aagaatggaa acattgtga atgctgatgg gacgaaaaca    1320
gctgaaacgg atcgttttag agatatttta gttctaacac caataaaggt agaatttgtt    1380
gtgaaaaatg ctccgacata ttatggtgat tctgtttata taacaggtaa ccgatgggaa    1440
atgggtatgt gggccagtca ggatggcaaa aagattaaac ttacctggga tgatgtaaat    1500
agggattgga gaggtactgg atatattgca gctagtcgct attatgagtt taaagctgta    1560
attgaagatt ctaatggaaa cacaaaagca tgggaaccta atagcaacaa cgtttggact    1620
acacctagca atgacacaag ttatacaata cagtggtag                          1659

<210> SEQ ID NO 28
<211> LENGTH: 1659
<212> TYPE: DNA
<213> ORGANISM: Bacillus halosaccharovorans

<400> SEQUENCE: 28
atgaaacatt tgtttatgcg tttaggaatt agtattatga tcgctgtact tatggtatta      60 cctcttttc agacggcagt aaatgctgaa atcaagacag attataaagc atctgttatg     120
gcaccattac gcaagattac gaactggaat gactttgcaa agcaacttgc tacgctaaaa     180
agtaatggtg tttatgcctt aacgaccgat gtttggtggg gagatgtcga gaaaaatggg     240
gataatcagt tgattggtc gtattatcgt caatatgcac aaacagtaag agagtctgga     300
cttaaatggg tacccatttt atctacacat cagtgtggtg gaaatgtagg agatgattgt     360
aatatccctg taccaaattg ggtatggat ttagattcca ttgatactct tacacataag     420
tccgaaacag gttatgtgag taaagaaacg gtttctccat gggcagccca ggtaatttct     480
acacaatatg atgaactcta tcaatctttt gcacaaaatt tctcagactt aaagacatc     540 attattaaaa tatatcttag tggtggacca gcgggtgaac ttagatttcc ttcctatgtt     600
tcaaatgata gctggtcata ccctttcaaga ggaaagctcc aatcttacac agacaccgca     660
aaacatgact tcagaagcaa tatgcaagca aaatatagca ccctttctaa tttaaattct     720
gcatggaaca caaatctaac atcttggagt gaagtcaacc ctccttctga tggagaccat     780 ttttttcactt caggtgctgc atattatagt caatatggta aggactttat gacctggtat     840
cagaatgtat taattaagca tttagagcgt ataagtagta agcgcatga aaactttgat     900 tcaaccttcg gggttccaat tggtgcaaag attgcaggaa ttcattggaa atgaatgat     960 ccatctatgc cgcacgcagc tgaatattca gcaggatact atcaatacac aacaataata    1020
gatcaattca agataagtaa tttacaccct tacctttacat gtctagaaat ggatgatagt    1080
caagcttata caagcccctta ttattccgca cctaaatctc ttgtaacaca aattgcaaat    1140
atagcaactt caaggggtat cgtattaaat ggtgagaatg cactagccat ctctagttca    1200
gatgcaaatt atagcgaaac tcgatatcga aatactgcgc agcatctatt taacgaagga    1260
tttagcggct tcacattatt aagaatggaa acattgtga atgctgatgg gacgaaaaca    1320
gctgaaacgg atcgttttag agatatttta gttctaacac caataaaggt agaatttgtt    1380
gtgaaaaatg ctccgacata ttatggtgat tctgtttata taacaggtaa ccgatgggaa    1440
atgggtatgt gggccagtca ggatggcaaa aagattaaac ttacctggga tgatgtaaat    1500
agggattgga gaggtactgg atatattgca gctagtcgct attatgagtt taaagctgta    1560
```

| | | |
|---|---|---|
| attgaagatt ctaatggaaa cacaaaagca tgggaaccta atagcaacaa cgtttggact | 1620 | |
| acacctagca atgacacaag ttatacaata cagtggtag | 1659 | |

<210> SEQ ID NO 29
<211> LENGTH: 1659
<212> TYPE: DNA
<213> ORGANISM: Bacillus halosaccharovorans

<400> SEQUENCE: 29

| | | |
|---|---|---|
| atgaaacatt tgtttatgcg tttaggaatt agtattatga tcgctgtact tatggtatta | 60 | |
| cctctttttc agacggcagt aaatgctgaa atcaagacag attataaagc atctgttatg | 120 | |
| gcaccattaa caaagattac gaactggaat gactttgcaa agcaacttgc tacgctaaaa | 180 | |
| agtaatggtg tttatgcctt aacgaccgat gtttggtggg agatgtcga gaaaaatggg | 240 | |
| gataatcagt ttgattggtc gtattatcgt caatatgcac aaacagtaag agagtctgga | 300 | |
| cttaaatggg tacccatttt atctacacat cagtgtggtg gaaatgtagg agatgattgt | 360 | |
| aatatccctg taccaaattg ggtatgggat ttagattcca ttgatactct tacacataag | 420 | |
| tccgaaacag gttatgtgag taaagaaacg gtttctccat gggcagccca ggtaatttct | 480 | |
| acacaatatg atgaactcta tcaatctttt gcacaaaatt tctcagactt aaagacatc | 540 | |
| attattaaaa tatatcttag tggtggacca gcgggtgaac ttagatttcc ttcctatgtt | 600 | |
| tcaaatgata gctggtcata cccttcaaga ggaaagctcc aatcttacac agacaccgca | 660 | |
| aaacatgact tcagaagcaa tatgcaagca aaatatagca ccctttctaa tttaaattct | 720 | |
| gcatggaaca caaatctaac atcttggagt gaagtcaacc ctccttctga tggagaccat | 780 | |
| tttttcactt caggtgctgc atattatagt caatatggta aggactttat gacctggtat | 840 | |
| cagaatgtat taattaagca tttagagcgt ataagtagta aagcgcatga aaactttgat | 900 | |
| tcaaccttcg gggttccaat tggtgcaaag attgcaggaa ttcattggaa atgaatgat | 960 | |
| ccatctatgc cgcacgcagc tgaatattca gcaggatact atgactacac aacaataata | 1020 | |
| gatcaattca agataagtaa tttacacctt acctttacat gtctagaaat ggatgatagt | 1080 | |
| caagcttata caagccctta ttattccgca cctaaatctc ttgtaacaca aattgcaaat | 1140 | |
| atagcaactt caaggggtat cgtattaaat ggtgagaatg cactagccat ctctagttca | 1200 | |
| gatgcaaatt atagcgaaac tcgatatcga aatactgcgc agcatctatt taacgaagga | 1260 | |
| tttagcggct tcacattatt aagaatggaa acattgtga atgctgatgg gacgaaaaca | 1320 | |
| gctgaaacgg atcgtttag agatatttta gttctaacac caataaaggt agaatttgtt | 1380 | |
| gtgaaaaatg ctccgacata ttatggtgat tctgtttata taacaggtaa ccgatgggaa | 1440 | |
| atgggtatgt gggccagtca ggatggcaaa aagattaaac ttacctggga tgatgtaaat | 1500 | |
| agggattgga gaggtactgg atatattgca gctagtcgct attatgagtt taaagctgta | 1560 | |
| attgaagatt ctaatggaaa cacaaaagca tgggaaccta atagcaacaa cgtttggact | 1620 | |
| acacctagca atgacacaag ttatacaata cagtggtag | 1659 | |

<210> SEQ ID NO 30
<211> LENGTH: 1572
<212> TYPE: DNA
<213> ORGANISM: Bacillus halosaccharovorans

<400> SEQUENCE: 30

| | | |
|---|---|---|
| gaaatcaagc cagattataa agcatctgtt atggcaccat taacaaagat tacgaactgg | 60 | |
| aatgactttg caaagcaact tgctacgcta aaaagtaatg gtgtttatgc cttaacgacc | 120 | |

```
gatgtttggt ggggagatgt cgagaaaaat ggggataatc agtttgattg gtcgtattat    180
cgtcaatatg cacaaacagt aagagagtct ggacttaaat gggtacccat tttatctaca    240
catcagtgtg gtggaaatgt aggagatgat tgtaatatcc ctgtaccaaa ttgggtatgg    300
gatttagatt ccattgatac tcttacacat aagtccgaaa caggttatgt gagtaaagaa    360
acggtttctc catgggcagc ccaggtaatt tctacacaat atgatgaact ctatcaatct    420
tttgcacaaa atttctcaga ctttaaagac atcattatta aaatatatct tagtggtgga    480
ccagcgggtg aacttagatt tccttcctat gtttcaaatg atagctggtc ataccctcca    540
agaggaaagc tccaatctta cacagacacc gcaaaacatg acttcagaag caatatgcaa    600
gcaaaatata gcaccctttc taatttaaat tctgcatgga acacaaatct aacatcttgg    660
agtgaagtca accctccttc tgatggagac cattttttca cttcaggtgc tgcatattat    720
agtcaatatg gtaaggactt tatgacctgg tatcagaatg tattaattaa gcatttagag    780
cgtataagta gtaaagcgca tgaaaacttt gattcaacct cgggggttcc aattggtgca    840
aagattgcag gaattcattg gaaaatgaat gatccatcta tgccgcacgc agctgaatat    900
tcagcaggat actatcaata cacaacaata atagatcaat tcaagataag taatttacac    960 cttacccttta catgtctaga atggatgat agtcaagctt atacaagccc ttattattcc   1020
gcacctaaat ctcttgtaac acaaattgca aatatagcaa cttcaagggg tatcgtatta   1080
aatggtgaga atgcactagc catctctagt tcagatgcaa attatagcga aactcgatat   1140
cgaaatactg cgcagcatct atttaacgaa ggatttagcg gcttcacatt attaagaatg   1200
gaaaacattg tgaatgctga tgggacgaaa acagctgaaa cggatcgttt tagagatatt   1260
ttagttctaa caccaataaa ggtagaattt gttgtgaaaa atgctccgac atattatggt   1320
gattctgttt atataacagg taaccgatgg gaaatgggta tgtgggccag tcaggatggc   1380
aaaaagatta aacttacctg ggatgatgta aatagggatt ggagaggtac tggatatatt   1440
gcagctagtc gctattatga gtttaaagct gtaattgaag attctaatgg aaacacaaaa   1500
gcatgggaac ctaatagcaa caacgtttgg actacaccta gcaatgacac aagttataca   1560
atacagtggt ag                                                        1572

<210> SEQ ID NO 31
<211> LENGTH: 1572
<212> TYPE: DNA
<213> ORGANISM: Bacillus halosaccharovorans

<400> SEQUENCE: 31
gaaatcaaga cagattataa agcatctgtt atggcaccat taaaaaagat tacgaactgg     60
aatgactttg caaagcaact tgctacgcta aaaagtaatg gtgtttatgc cttaacgacc    120
gatgtttggt ggggagatgt cgagaaaaat ggggataatc agtttgattg gtcgtattat    180
cgtcaatatg cacaaacagt aagagagtct ggacttaaat gggtacccat tttatctaca    240
catcagtgtg gtggaaatgt aggagatgat tgtaatatcc ctgtaccaaa ttgggtatgg    300
gatttagatt ccattgatac tcttacacat aagtccgaaa caggttatgt gagtaaagaa    360
acggtttctc catgggcagc ccaggtaatt tctacacaat atgatgaact ctatcaatct    420
tttgcacaaa atttctcaga ctttaaagac atcattatta aaatatatct tagtggtgga    480
ccagcgggtg aacttagatt tccttcctat gtttcaaatg atagctggtc ataccctcca    540
agaggaaagc tccaatctta cacagacacc gcaaaacatg acttcagaag caatatgcaa    600
```

```
gcaaaatata gcacccttc taatttaaat tctgcatgga acacaaatct aacatcttgg      660
agtgaagtca accctccttc tgatggagac cattttttca cttcaggtgc tgcatattat      720
agtcaatatg gtaaggactt tatgacctgg tatcagaatg tattaattaa gcatttagag      780
cgtataagta gtaaagcgca tgaaaacttt gattcaacct cggggttcc aattggtgca       840 aagattgcag gaattcattg gaaaatgaat gatccatcta tgccgcacgc agctgaatat      900
tcagcaggat actatcaata cacaacaata atagatcaat tcaagataag taatttacac     960 cttacccttta catgtctaga aatggatgat agtcaagctt atacaagccc ttattattcc    1020
gcacctaaat ctcttgtaac acaaattgca aatatagcaa cttcaagggg tatcgtatta    1080
aatggtgaga atgcactagc catctctagt tcagatgcaa attatagcga aactcgatat    1140
cgaaatactg cgcagcatct atttaacgaa ggatttagcg gcttcacatt attaagaatg    1200
gaaaacattg tgaatgctga tgggacgaaa acagctgaaa cggatcgttt tagagatatt    1260
ttagttctaa caccaataaa ggtagaattt gttgtgaaaa atgctccgac atattatggt    1320
gattctgttt atataacagg taaccgatgg gaaatgggta tgtgggccag tcaggatggc    1380
aaaaagatta aacttacctg ggatgatgta aatagggatt ggagaggtac tggatatatt    1440
gcagctagtc gctattatga gtttaaagct gtaattgaag attctaatgg aaacacaaaa    1500
gcatgggaac ctaatagcaa caacgtttgg actacaccta gcaatgacac aagttataca    1560
atacagtggt ag                                                         1572

<210> SEQ ID NO 32
<211> LENGTH: 1572
<212> TYPE: DNA
<213> ORGANISM: Bacillus halosaccharovorans

<400> SEQUENCE: 32
gaaatcaaga cagattataa agcatctgtt atggcaccat tacgcaagat tacgaactgg      60
aatgactttg caaagcaact tgctacgcta aaaagtaatg gtgtttatgc cttaacgacc    120
gatgtttggt ggggagatgt cgagaaaaat ggggataatc agtttgattg gtcgtattat    180
cgtcaatatg cacaaacagt aagagagtct ggacttaaat gggtacccat tttatctaca    240
catcagtgtg gtggaaatgt aggagatgat tgtaatatcc ctgtaccaaa ttgggtatgg    300
gatttagatt ccattgatac tcttacacat aagtccgaaa caggttatgt gagtaaagaa    360
acggtttctc catgggcagc ccaggtaatt tctacacaat atgatgaact ctatcaatct    420
tttgcacaaa atttctcaga cttttaaagac atcattatta aaatatatct tagtggtgga    480
ccagcgggtg aacttagatt tccttcctat gtttcaaatg atagctggtc ataccccttca    540 agaggaaagc tccaatctta cacagacacc gcaaaacatg acttcagaag caatatgcaa    600
gcaaaatata gcacccttc taatttaaat tctgcatgga acacaaatct aacatcttgg     660
agtgaagtca accctccttc tgatggagac cattttttca cttcaggtgc tgcatattat    720
agtcaatatg gtaaggactt tatgacctgg tatcagaatg tattaattaa gcatttagag    780
cgtataagta gtaaagcgca tgaaaacttt gattcaacct cggggttcc aattggtgca      840 aagattgcag gaattcattg gaaaatgaat gatccatcta tgccgcacgc agctgaatat    900
tcagcaggat actatcaata cacaacaata atagatcaat tcaagataag taatttacac    960 cttacccttta catgtctaga aatggatgat agtcaagctt atacaagccc ttattattcc  1020
gcacctaaat ctcttgtaac acaaattgca aatatagcaa cttcaagggg tatcgtatta  1080
aatggtgaga atgcactagc catctctagt tcagatgcaa attatagcga aactcgatat  1140
```

```
cgaaatactg cgcagcatct atttaacgaa ggatttagcg gcttcacatt attaagaatg      1200
gaaaacattg tgaatgctga tgggacgaaa acagctgaaa cggatcgttt tagagatatt      1260
ttagttctaa caccaataaa ggtagaattt gttgtgaaaa atgctccgac atattatggt      1320
gattctgttt atataacagg taaccgatgg gaaatgggta tgtgggccag tcaggatggc      1380
aaaaagatta aacttacctg ggatgatgta aatagggatt ggagaggtac tggatatatt      1440
gcagctagtc gctattatga gtttaaagct gtaattgaag attctaatgg aaacacaaaa      1500
gcatgggaac ctaatagcaa caacgtttgg actacaccta gcaatgacac aagttataca      1560
atacagtggt ag                                                          1572

<210> SEQ ID NO 33
<211> LENGTH: 1572
<212> TYPE: DNA
<213> ORGANISM: Bacillus halosaccharovorans

<400> SEQUENCE: 33
gaaatcaaga cagattataa agcatctgtt atggcaccat taacaaagat tacgaactgg       60
aatgactttg caaagcaact tgctacgcta aaaagtaatg gtgtttatgc cttaacgacc      120
gatgtttggt ggggagatgt cgagaaaaat ggggataatc agtttgattg gtcgtattat      180
cgtcaatatg cacaaacagt aagagagtct ggacttaaat gggtacccat tttatctaca      240
catcagtgtg gtggaaatgt aggagatgat tgtaatatcc ctgtaccaaa ttgggtatgg      300
gatttagatt ccattgatac tcttacacat aagtccgaaa caggttatgt gagtaaagaa      360
acggtttctc catgggcagc ccaggtaatt tctacacaat atgatgaact ctatcaatct      420
tttgcacaaa atttctcaga ctttaaagac atcattatta aaatatatct tagtggtgga      480
ccagcgggtg aacttagatt tccttcctat gtttcaaatg atagctggtc ataccccttca      540 agaggaaagc tccaatctta cacagacacc gcaaaacatg acttcagaag caatatgcaa      600
gcaaaatata gcacccttc taatttaaat tctgcatgga acacaaatct aacatcttgg      660
agtgaagtca accctccttc tgatggagac cattttttca cttcaggtgc tgcatattat      720
agtcaatatg gtaaggactt tatgacctgg tatcagaatg tattaattaa gcatttagag      780
cgtataagta gtaaagcgca tgaaaacttt gattcaacct tcggggttcc aattggtgca      840
aagattgcag gaattcattg gaaaatgaat gatccatcta tgccgcacgc agctgaatat      900
tcagcaggat actatgacta cacaacaata atagatcaat tcaagataag taatttacac      960 cttacccttta catgtctaga aatggatgat agtcaagctt atacaagccc ttattattcc     1020
gcacctaaat ctcttgtaac acaaattgca aatatagcaa cttcaagggg tatcgtatta     1080
aatggtgaga atgcactagc catctctagt tcagatgcaa attatagcga aactcgatat     1140
cgaaatactg cgcagcatct atttaacgaa ggatttagcg gcttcacatt attaagaatg     1200
gaaaacattg tgaatgctga tgggacgaaa acagctgaaa cggatcgttt tagagatatt     1260
ttagttctaa caccaataaa ggtagaattt gttgtgaaaa atgctccgac atattatggt     1320
gattctgttt atataacagg taaccgatgg gaaatgggta tgtgggccag tcaggatggc     1380
aaaaagatta aacttacctg ggatgatgta aatagggatt ggagaggtac tggatatatt     1440
gcagctagtc gctattatga gtttaaagct gtaattgaag attctaatgg aaacacaaaa     1500
gcatgggaac ctaatagcaa caacgtttgg actacaccta gcaatgacac aagttataca     1560
atacagtggt ag                                                         1572
```